(12) United States Patent
Lewis

(10) Patent No.: US 11,966,206 B2
(45) Date of Patent: Apr. 23, 2024

(54) REMOTELY CONTROLLING A HYDRAULIC SYSTEM

(71) Applicant: Koodaideri Innovation & Technology Pty Ltd, Naval Base (AU)

(72) Inventor: Shane Russell Lewis, Baldivis (AU)

(73) Assignee: Koodaideri Innovation & Technology Pty Ltd, Perth (AU)

( * ) Notice: Subject to any disclaimer, the term of this patent is extended or adjusted under 35 U.S.C. 154(b) by 0 days.

(21) Appl. No.: 17/712,299

(22) Filed: Apr. 4, 2022

(65) Prior Publication Data

US 2022/0260958 A1 Aug. 18, 2022

Related U.S. Application Data

(63) Continuation of application No. 17/427,258, filed as application No. PCT/AU2020/050103 on Feb. 7, 2020, now Pat. No. 11,507,040.

(30) Foreign Application Priority Data

Feb. 11, 2019 (AU) .................................. 2019900428

(51) Int. Cl.
*F15B 21/02* (2006.01)
*G05B 19/042* (2006.01)
*H04W 4/38* (2018.01)

(52) U.S. Cl.
CPC ............ *G05B 19/042* (2013.01); *F15B 21/02* (2013.01); *G05B 2219/25312* (2013.01); *H04W 4/38* (2018.02)

(58) Field of Classification Search
CPC ...... F16K 1/221; F16K 31/04; Y10T 74/1836; F15B 19/00; F15B 19/002; F15B 2211/885
See application file for complete search history.

(56) References Cited

U.S. PATENT DOCUMENTS 3,807,245 A * 4/1974 Sheppard .................. F16K 5/04
 251/335.1
4,050,472 A * 9/1977 Sheppard ........... B60H 1/00485
 251/185

(Continued)

FOREIGN PATENT DOCUMENTS

JP 2006-107461 A 4/2006
JP 2017-503944 A 2/2017

(Continued)

OTHER PUBLICATIONS

Patent Examination Report in New Zealand Application No. 777112 dated May 2, 2022, 3 pages.

(Continued)

*Primary Examiner* — Thomas E Lazo
(74) *Attorney, Agent, or Firm* — MARSHALL, GERSTEIN & BORUN LLP

(57) ABSTRACT

In one aspect, an actuator for actuating a device comprises driving means adapted to be operatively connected to the device, and operable to receive a reaction element for engaging the device. The driving means further comprises an output adapted to be operatively engaged with the device for actuation of the device whilst the reaction element is engaging the device.

28 Claims, 34 Drawing Sheets

(56) References Cited

U.S. PATENT DOCUMENTS

| | | | |
|---|---|---|---|
| 6,817,378 B2 * | 11/2004 | Zelczer | F15B 15/1428 |
| | | | 92/248 |
| 6,880,806 B2 * | 4/2005 | Haikawa | F16K 31/041 |
| | | | 251/305 |
| 8,257,213 B2 | 9/2012 | Komada et al. | |
| 9,360,131 B2 * | 6/2016 | Nashery | F16K 31/522 |
| 9,863,124 B2 | 1/2018 | Ishihara et al. | |
| 10,054,166 B2 * | 8/2018 | Bakken | F16D 1/10 |
| 2008/0257422 A1 * | 10/2008 | Fack | F15B 13/0875 |
| | | | 91/361 |
| 2012/0023922 A1 | 2/2012 | Renner et al. | |
| 2013/0219877 A1 * | 8/2013 | Hughes | F15B 13/044 |
| | | | 73/1.72 |
| 2013/0297045 A1 * | 11/2013 | Yuan | G05D 16/2024 |
| | | | 700/28 |
| 2014/0260722 A1 * | 9/2014 | Kopp | F16H 21/44 |
| | | | 74/68 |
| 2014/0326908 A1 | 11/2014 | Schober et al. | |
| 2014/0379098 A1 | 12/2014 | Masten et al. | |
| 2015/0147955 A1 * | 5/2015 | Yoskowitz | F16K 1/22 |
| | | | 454/333 |
| 2017/0328413 A1 * | 11/2017 | Bamberger | F16K 1/221 |
| 2018/0246712 A1 | 8/2018 | Aizawa et al. | |
| 2018/0267565 A1 | 9/2018 | Jensen et al. | |
| 2018/0282972 A1 * | 10/2018 | Olsson | F15B 19/002 |

FOREIGN PATENT DOCUMENTS

| | | | |
|---|---|---|---|
| KR | 20160101270 A * | 8/2016 | |
| WO | WO-2007065082 A2 | 6/2007 | |
| WO | WO-2015/097247 A1 | 7/2015 | |

OTHER PUBLICATIONS

Office Action in CA Application No. 3,127,957 dated May 27, 2022, 4 pages.
Extended Search Report in International Patent Application No. EP 20 75 5213, dated Oct. 6, 2022, 9 pages.
Examination Report in Australian Patent Application No. 2021290306 dated Jan. 30, 2023, 5 pages.
Office Action in Japanese Patent Application No. 2021-543494 dated Jan. 23, 2023, 15 pages.
Second Office Action in Canadian Patent Application No. 3,127,957 dated Jan. 11, 2023, 7 pages.
International Search Report and Written Opinion in International Application No. PCT/AU2020/050103 dated Apr. 14, 2020, 10 pages.
Article 34 Amendments, International Preliminary Report on Patentability in International Application No. PCT/AU2020/050103 dated May 20, 2021, 112 pages.
Go et al., Hydraulic actuator with power line communication for valve remote control system, Springer International Publishing, Switzerland, pp. 414-423 (2014).
Walters, Hydraulic and electric-hydraulic control systems, Springer Science+Business Media, Dordrecht (2000).
Australian Patent Application No. 2020220231, Examination Report No. 1, dated Aug. 17, 2021.
Office Action in CA Application No. 3,127,957 dated Jun. 2, 2023, 3 pages.
Office Action in AU Application No. 290288 dated Jan. 25, 2024, 3 pages Office Action in AU Application No. 2021290306 dated Jan. 25, 2024, 3 pages.
Office Action in CA Application No. 3,174,616 dated Dec. 6, 2023, 4 pages.

* cited by examiner

| N | $D_i$ | $D$ | $D_o$ | $D_b$ | $b_i$ | $\varnothing$ | p |
|---|---|---|---|---|---|---|---|
| 30 | 58.36 | 61.36 | 64.34 | 53.41 | 1.46 | 32.47 | 0.489 |

| Nominal Drive Size | | Design | Am | | Bm | Cm | | Dm | | Fm | Rm |
|---|---|---|---|---|---|---|---|---|---|---|---|
| | | | Max | Min | Max | Max | Min | Max | Min | Max | Max |
| Inch | 3/8 | A | 0.377 | 0.372 | 0.5 | 0.438 | 0.406 | 0.277 | 0.215 | 0.156 | 0.031 |
| mm | 9.525 | A | 9.576 | 9.449 | 12.7 | 11.125 | 10.312 | 7.036 | 5.461 | 3.962 | 0.787 |

| | | | |
|---|---|---|---|
| Principal dimensions | d | 15 | mm |
| | D | 32 | mm |
| | B | 9 | mm |
| Basic Load ratings | C (dynamic) | 5.85 | kN |
| | C₀ (static) | 2.85 | kN |
| Fatigue load limit | $P_u$ | 0.12 | kN |
| Speed ratings | Reference | 14000 | r/min |
| | Limiting | 0.025 | r/min |
| Mass | | 0.03 | kg |

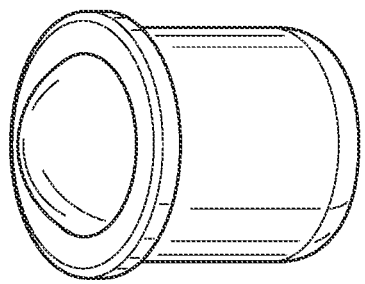
FIG. 19A
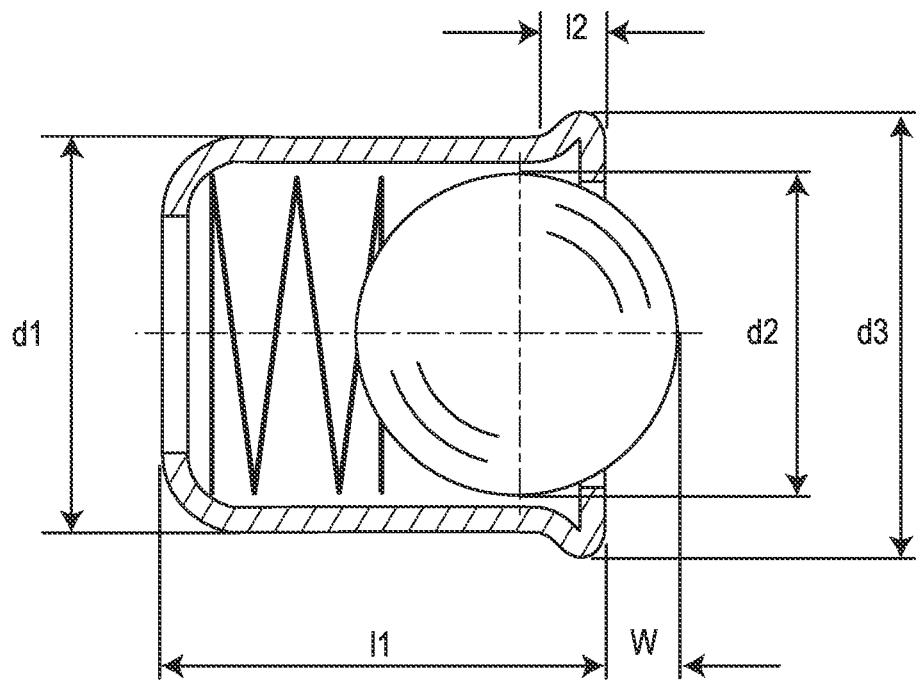
FIG. 19B
| Description | $d_1$+0.1 | $d_2$ | $d_3$ | $l_1$ | $l_2$ | w | Spring Preload [N] | Spring Max Load [N] |
|---|---|---|---|---|---|---|---|---|
| GN 614-4-NI | 4 | 3 | 4.6 | 5 | 0.9 | 1 | 2.5 | 6 |
FIG. 19C

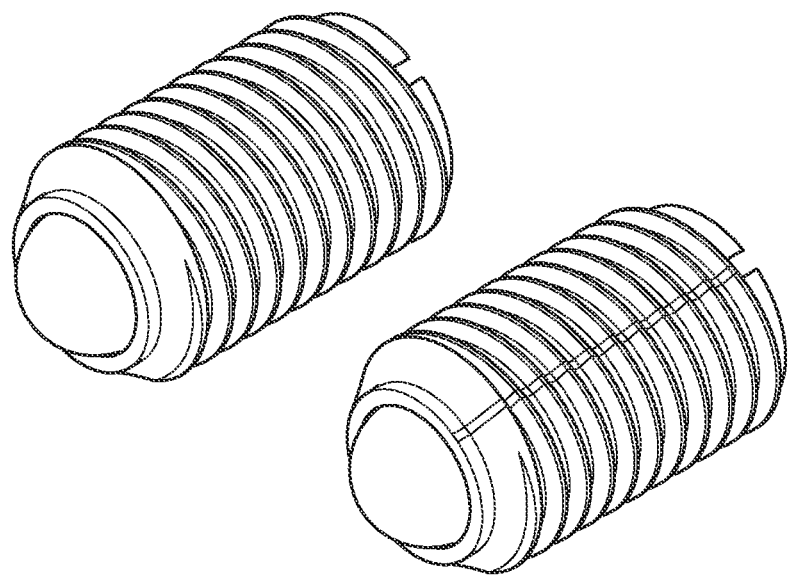
FIG. 20A
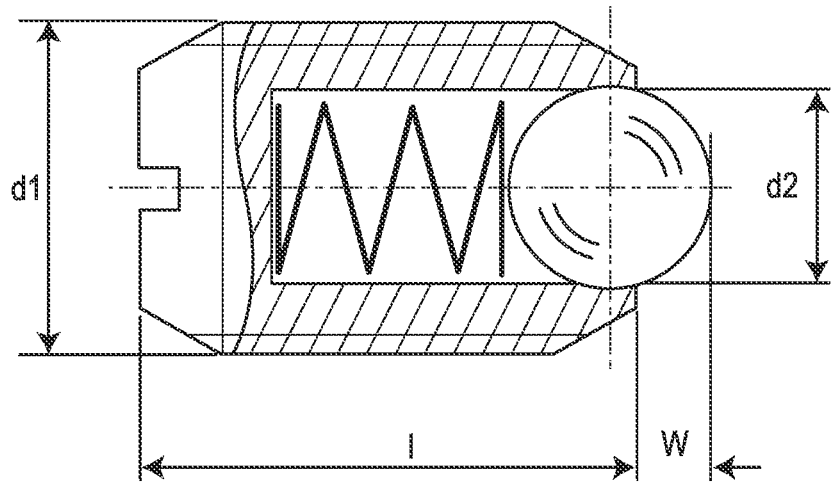
FIG. 20B
| Description | $d_1$ | $d_2$ | $l_{\pm 0.1}$ | w | Spring Preload [N] | Spring Max Load [N] |
|---|---|---|---|---|---|---|
| GN 615.3-M6-KN | M6 | 3.5 | 14 | 1 | 11 | 18 |
FIG. 20C

PLAN VIEW

SECTION A-A
SCALE: 1:2

ELEVATION

SIDE VIEW

REMOTELY CONTROLLING A HYDRAULIC SYSTEM

CROSS-REFERENCE TO RELATED APPLICATIONS

This application is a continuation of U.S. patent application Ser. No. 17/427,258 filed Jul. 30, 2021, which is a U.S. national phase of PCT/AU2020/050103 filed Feb. 7, 2020, which claims the Convention priority of AU 2019900428 filed Feb. 11, 2019. The entire disclosure of each of the above-identified applications is hereby incorporated herein by reference.

FIELD OF THE INVENTION

The present invention relates generally to performing an action.

The present invention will be described with particular reference to remotely performing a hydraulic tuning action in respect of a system comprising a hydraulic circuit.

However, it will be appreciated that the invention is not limited to this particular field of use, it may be used in respect of other systems, and for performing one or more actions, and for additional and/or alternative purposes.

BACKGROUND

Any discussion of the background art throughout the specification should in no way be considered as an admission that such background art is prior art, nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicant reserves the right to challenge the accuracy and pertinence of the cited documents. It will be clearly understood that, although a number of prior art publications are referred to herein, this reference does not constitute an admission that any of these documents forms part of the common general knowledge in the art, in Australia or in any other country.

A hydraulic circuit is a system comprising an interconnected set of discrete components that transport liquid. The purpose of this system may be to control where fluid flows or to control fluid pressure. As one example, hydraulic machinery uses hydraulic circuits, in which hydraulic fluid is pushed, under pressure, through discrete components such as hydraulic pumps, pipes, tubes, hoses, hydraulic motors, hydraulic cylinders, and so on, to move a load.

FIG. 1 of the drawings depicts an example of existing hydraulic machinery 10 comprising a hydraulic circuit 12.

In order to function as designed, hydraulic circuits and their individual components require initial and regular adjustments to set up the circuit for its intended function and over time to adjust for the condition of the individual components that can affect the performance of the circuit. The performance of such adjustment actions may be referred to as hydraulic tuning of the circuit.

These adjustments are traditionally performed by trained technicians or mechanics using hand tools 14, as depicted in FIG. 2, for example, and hydraulic testing equipment (including flow meters 16, as depicted in FIG. 3, and pressure gauges 18, as depicted in FIG. 4, for example) and are often performed in hazardous locations surrounded by multiple high-pressure hydraulic circuits, inside moving machinery, and with ambient temperatures often exceeding 60° C. Undertaking such work, in such an environment, is both unpleasant and dangerous for the technicians involved.

Particularly, and with reference to FIG. 5 of the drawings, an adjustment of a valve 20 (i.e. a valve adjustment action) of a hydraulic circuit is currently made by the technician unlocking an adjusting screw lock nut 22 of the valve 20, physically rotating an adjusting screw 24 inside a body 26 of the valve 20 with an appropriate hand tool (such as a wrench) while monitoring a pressure guage/flow meter that is operably attached to the circuit being adjusted.

The adjusting screw 24 is turned until the circuit is at the desired pressure or flow rating, as depicted in FIG. 6 of the drawings.

In order to confirm that a hydraulic pump/circuit is performing as designed or intended, hydraulic flow testing is required. To achieve this, a hydraulic flow testing action is performed in which a hydraulic flow meter 28, as depicted in FIG. 7 of the drawings, is operably installed in the circuit by the technician, receiving hydraulic input via an input port 30 and providing hydraulic output via an output port 32. A loading valve 34 of the hydraulic flow meter 28 is operable to allow the technician to artificially increase the upstream pressure in the circuit. In this manner, the hydraulic flow meter 28 facilitates verifying the operation and integrity of the hydraulic components of the circuit being tested upstream while providing pressure and hydraulic flow readings to the technician (via an hydraulic pressure test point 36 and oil flow and temperature signal 38 of the hydraulic flow meter 28 operably connected to an appropriate indicating device 40).

As depicted in FIG. 8, manually increasing the pressure in the hydraulic circuit by using the loading valve 34 often situates the technician near high pressure hydraulic circuits, high ambient temperatures and high noise environments inside operating equipment, thereby posing a significant risk to the health and safety of the technician.

A particular example of the hereinbefore described traditional (manual) method of valve control and associated issues will now be described with reference to FIGS. 22A to 22F of the drawings.

Large mining machines, such as Excavators/Loading Shovels 210, as depicted in FIGS. 22A to 22C, use a number of high-pressure hydraulic rams or cylinders to operate a digging arm 212 thereof. Typically, all of the hydraulic cylinders are controlled by Hydraulic Spool Valves (which may also be referred to as Directional Control Valves or DCVs) implemented as part of an appropriate hydraulic system control circuit, examples of which are depicted in FIGS. 22D and 22E.

Periodically, the hydraulic system of the machines requires tuning that involves a technician manually adjusting Spool Valve Circuit Reliefs (an example of which is depicted in FIG. 22F) positioned down in a control or pump room of the Excavator/Loading Shovel 210 to ensure or seek optimal operation thereof.

Some of the issues associated with this method of tuning include:
  it being a potentially hazardous operation for the technician as the control/pump room contains the hydraulic system (which may be running/operating up to 5000 PSI through the pumps/valves thereof). If a malfunction occurs, the technician may be seriously injured (by burns and/or hydraulic injection, for example);

discomfort for the technician involved in the operation due to conditions of high heat/temperature and poor ventilation in the control room;

it being a tedious process requiring the technician to access the control room to perform tuning and check the status of the hydraulic system; and it being a time consuming process and providing no access to live data from the hydraulic system.

Prior to the present invention, the only way to tune the valves and pumps on this type of machinery is by manually adjusting each spool valve using appropriate tools, as hereinbefore described.

This requires the technician to physically enter the control/pump room to make the necessary adjustments, increasing their exposure to potential risks/discomforts including risk of hydraulic incident and heat exposure.

Once the adjustments are made, the technician needs to test them by accessing a driver's cab of the Excavator/Loading Shovel 210.

Accordingly, the traditional method of tuning such machines is dangerous, time consuming, and inefficient.

It is against this background that the present invention has been developed.

SUMMARY OF THE INVENTION

Embodiments of the present invention seek to overcome, or at least ameliorate, one or more of the disadvantages of the prior art, or to provide the consumer with a useful or commercial choice.

Other advantages of embodiments of the present invention will become apparent from the following description, taken in connection with the accompanying drawings, wherein, by way of illustration and example, a preferred embodiment of the present invention is disclosed.

According to a first broad aspect of the present invention, there is provided a system for performing an action, the system comprising:
a tool operable to perform at least the action;
a controller;
storage storing electronic program instructions for controlling the controller; and
an input means;
wherein the controller is operable, under control of the electronic program instructions, to:
receive input via the input means;
process the input and, on the basis of the processing, control the tool to perform the action.

Embodiments and implementations of the above described aspect, and those aspects described below, may incorporate one or more of the following optional features.

Optionally, the action is performed on, in respect of, in association with, and/or in relation to, an other system, which may comprise at least one hydraulic circuit.

Optionally, the tool may be part of an interface for operably coupling the system to the other system.

Optionally, the input comprises details. The details may comprise data and/or information of, associated with, and/or related to: the tool; the action to be performed; and/or the other system.

The data and/or information may be obtained by one or more of retrieving, receiving, extracting, and identifying it, from one or more sources, which may include the tool and the other system.

The processing of the input may comprise an analysis of the details, in which case the controller may be operable, under control of the electronic program instructions, to control the tool on the basis of the analysis.

Optionally, the system comprises a display for displaying a user interface, and the controller is operable, under control of the electronic program instructions, to generate an output on the basis of the processing, and communicate the output via the display.

The tool may comprise at least one actuator, which may be part of an actuator system or a set of actuators.

The input means may comprise at least one sensor, which may be part of a sensor system or a set of sensors. Individual sensors within the set of sensors may be operable to monitor, sense and gather or measure sensor data and/or information associated with and/or relating to one or more characteristics, properties and/or parameters of one or more of the system, the action to be performed, the other system, and the surrounding environment, or components, systems or devices associated therewith or coupled thereto.

Individual sensors within the set of sensors may comprise: a hydraulic pressure sensor; a hydraulic flow sensor; and a temperature sensor.

The action may be performed remotely from a user of the system.

Optionally, the input comprises user instructions which are input by a user via the input means. The user instructions may comprise a command to perform the action, in which case the controller is operable, under control of the electronic program instructions, to perform the action according to the received user instructions.

In an embodiment, the electronic program instructions comprise software.

Optionally, the system is implemented in a device. The device may be a mobile communication device, in which case it may comprise a smartphone, notebook/tablet/desktop computer, or portable media device, having the software installed thereon. The software may be provided as a software application downloadable to the device.

Optionally, operations performed by the system occur automatically, without requiring human intervention.

According to a second broad aspect of the present invention, there is provided a method for performing an action, the method comprising:
storing electronic program instructions for controlling a controller; and
controlling the controller via the electronic program instructions, to:
receive input via an input means; and
process the input and, on the basis of the processing, control a tool operable to perform at least the action, to perform the action.

According to a third broad aspect of the present invention, there is provided an actuator for use with the system according to the first broad aspect of the present invention, and/or the method according to the second broad aspect of the present invention, as hereinbefore described.

According to a fourth broad aspect of the present invention, there is provided a sensor for use with the system according to the first broad aspect of the present invention, and/or the method according to the second broad aspect of the present invention, as hereinbefore described.

According to a fifth broad aspect of the present invention, there is provided a computer-readable storage medium on which is stored instructions that, when executed by a computing means, causes the computing means to perform the method according to the second broad aspect of the present invention as hereinbefore described.

According to a sixth broad aspect of the present invention, there is provided a computing means programmed to carry out the method according to the second broad aspect of the present invention as hereinbefore described.

According to a seventh broad aspect of the present invention, there is provided a data signal including at least one instruction being capable of being received and interpreted by a computing system, wherein the instruction implements the method according to the second broad aspect of the present invention as hereinbefore described.

According to an eighth broad aspect of the present invention, there is provided a device for performing an action comprising a system according to the first broad aspect of the present invention as hereinbefore described.

BRIEF DESCRIPTION OF THE DRAWINGS

Notwithstanding any other forms which may fall within the scope of the present invention, in order that the invention may be more fully understood and put into practice, preferred embodiments of the invention will now be described, by way of example only, with reference to the accompanying drawings, in which:

FIGS. 19A, 19B, and 19C depict specifications for a ball detent plunger of the valve actuator of FIG. 13A;

FIGS. 20A, 20B, and 20C depict specifications for spring plungers of a spline reaction arm attachment of the valve actuator of FIG. 13A;

DEFINITIONS

Figure 1:
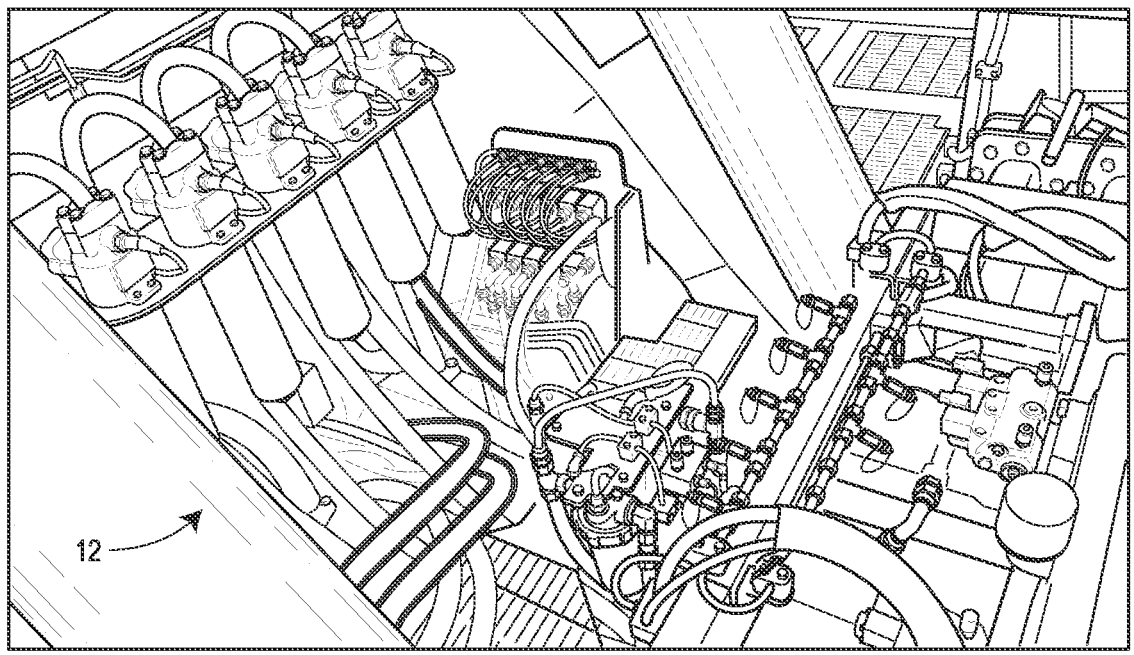
FIG. 1 depicts an example of existing hydraulic machinery comprising a hydraulic circuit.
Figure 2:
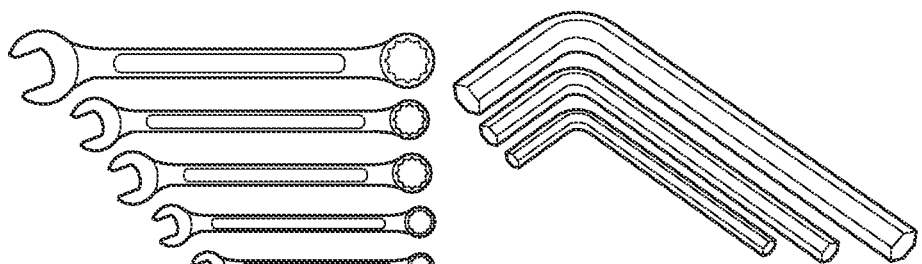
FIG. 2 depicts examples of existing hand tools.
Figure 3:
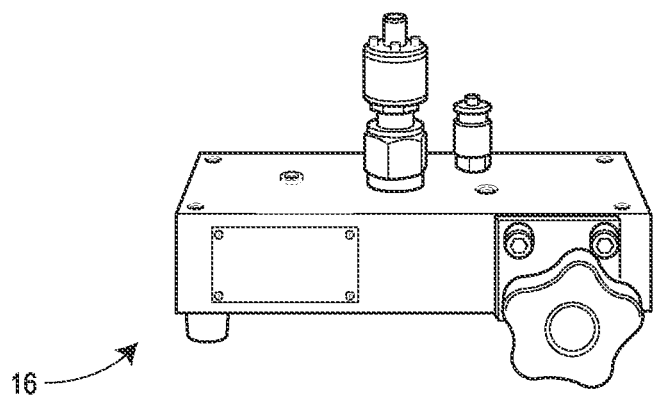
FIG. 3 depicts an example of an existing flow meter.
Figure 4:
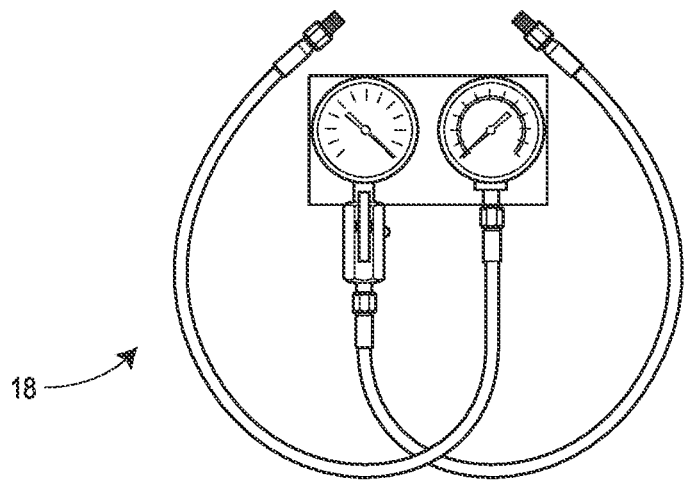
FIG. 4 depicts an example of an existing pressure gauge.
Figure 5:
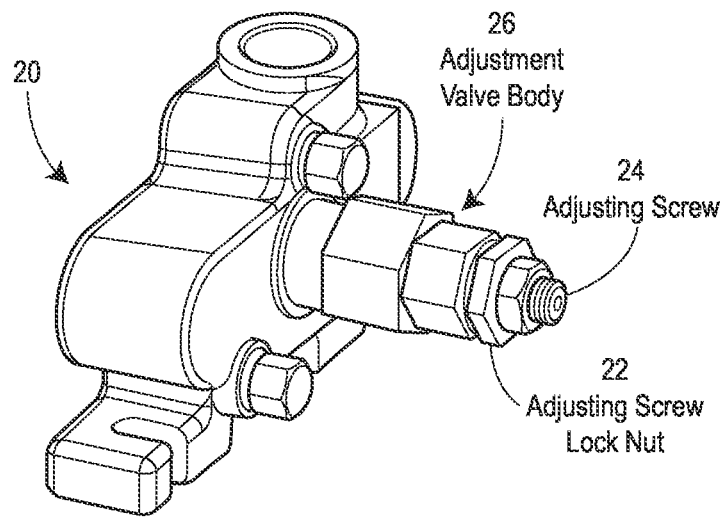
FIG. 5 depicts an example of a valve of a hydraulic circuit.
Figure 6:
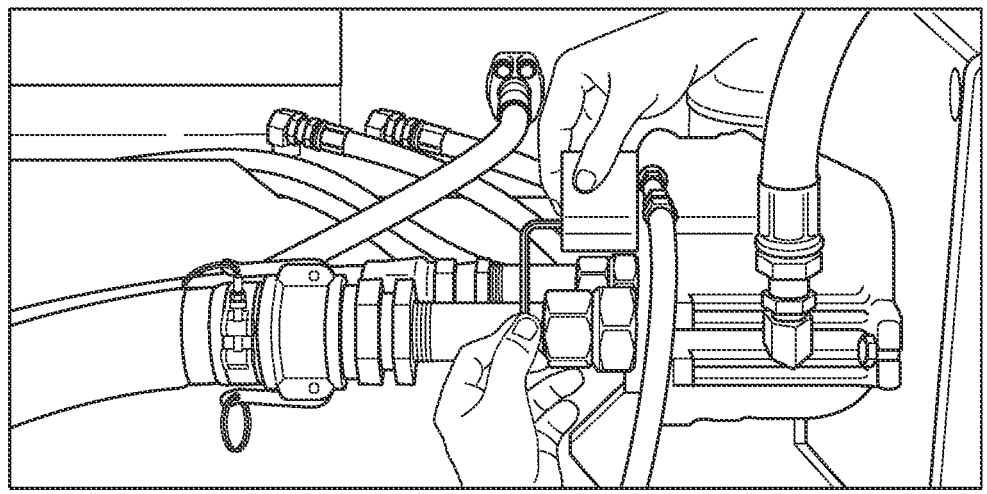
FIG. 6 depicts an example of a conventional adjustment action being performed on a valve of a hydraulic circuit.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

The term, "real-time", for example "displaying real-time data," refers to the display of the data without intentional delay, given the processing limitations of the system and the time required to accurately measure the data.

The term. "near-real-time", for example "obtaining real-time or near-real-time data" refers to the obtaining of data either without intentional delay ("real-time") or as close to real-time as practically possible (i.e. with a small, but minimal, amount of delay whether intentional or not within the constraints and processing limitations of the of the system for obtaining and recording or transmitting the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DESCRIPTION OF EMBODIMENTS

It should be noted in the following description that like or the same reference numerals in different embodiments denote the same or similar features.

Figure 9:
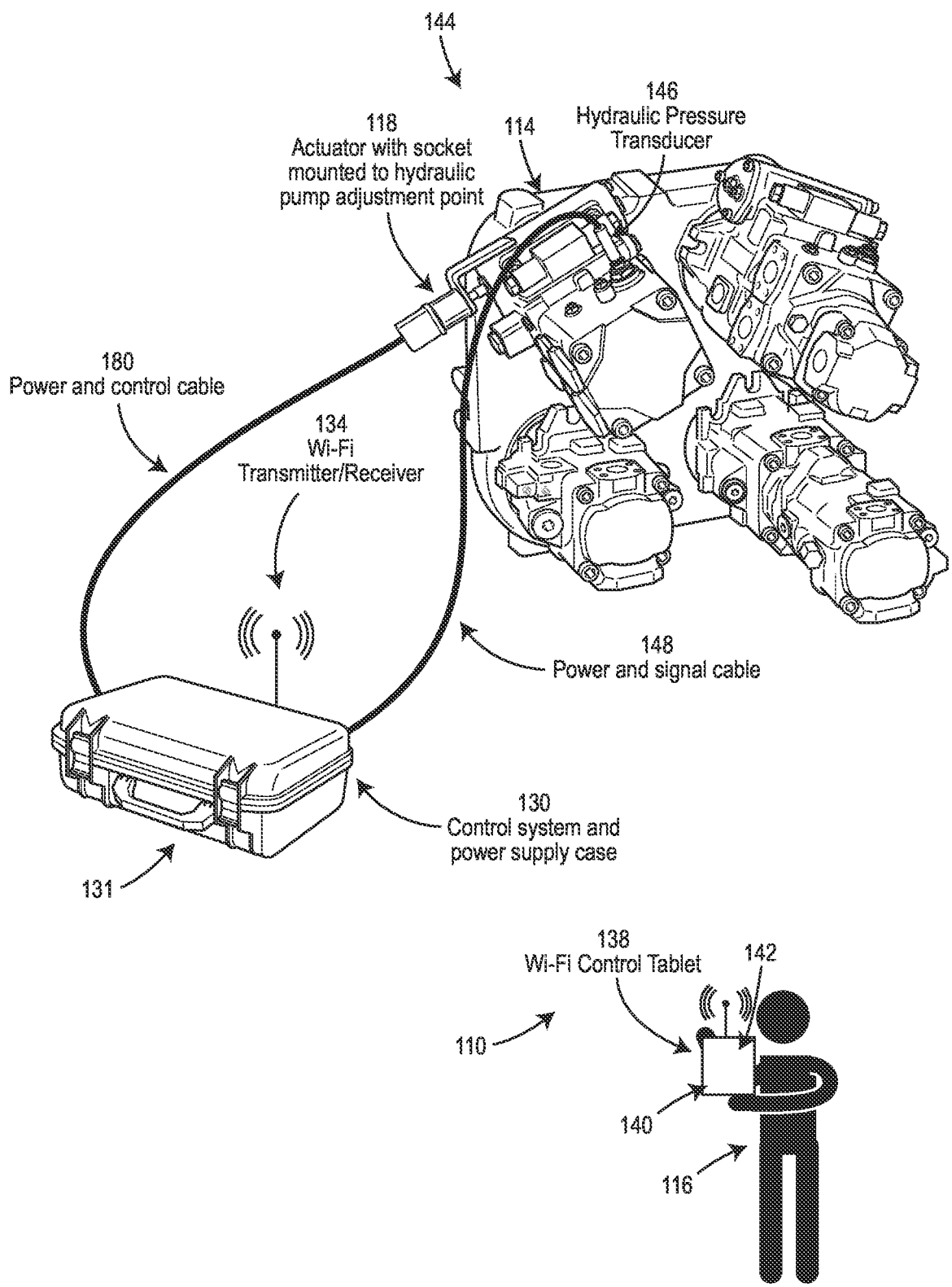
FIG. 9 depicts an embodiment of a system for performing an action in accordance with aspects of the present invention, arranged according to a first operational set up.
Figure 10:
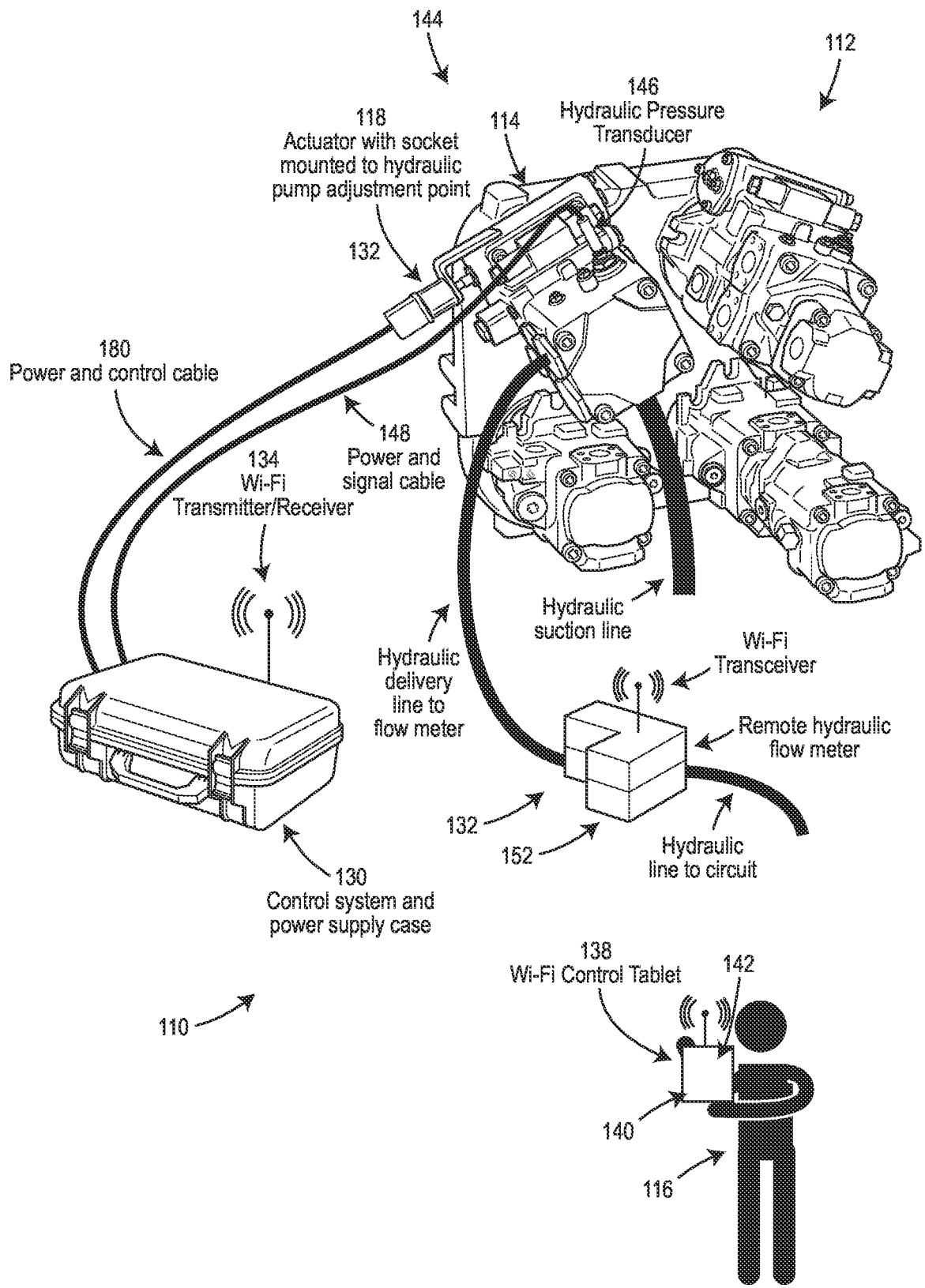
FIG. 10 depicts the embodiment of the system of FIG. 9 arranged according to a second operational set up.

In FIGS. 9 and 10, there is depicted a first embodiment of a system 110 for performing an action in accordance with aspects of the present invention, arranged according to a first operational set up and a second operational set up, respectively.

In the embodiment described, the action is performed on, in respect of, in association with, and/or in relation to, another system 112, which may be referred to as a second system, comprising a hydraulic pump 114.

As will be described in further detail, the system 110 is operable to allow a technician 116, being a user or operator of the system 110, to perform a plurality of actions or operations comprising hydraulic system testing and adjustments on, or in respect of, the hydraulic pump 114. That is to say, to conduct hydraulic tuning of the hydraulic pump 114.

Particularly, the system 110 implements a hydraulic tuning (or flow control) system allowing hydraulic circuit tuning without the technician 116 having to physically be present at the site of the hydraulic circuit (for example, without having to be within the control/pump room of a machine such as an Excavator/Loading Shovel). The system 110 of the embodiment enables the technician 116 to make actions such as valve and pressure adjustments, whilst also being able to monitor hydraulic flow rate, temperature(s) and pressure(s), remotely (for example, from the driver's cab of the Excavator/Loading Shovel instead of the control/pump room). The system 110 of the embodiment achieves this through a custom software application, operated on a tablet computer or similar device, which allows the technician 116 to make valve adjustments while visualising corresponding pressure and temperature changes "on the fly".

It will be appreciated that the invention is not limited in regard to the other system on, or in respect of which, the action is to be performed, and in alternative embodiments may be used in respect of systems other than hydraulic pumps, and for performing actions for additional and/or alternative purposes.

In the embodiment, the system 110 is provided under the trade mark HYDRATUNE™.

The system 110 comprises an electromechanical product comprising of a number of integrated components.

Particularly, as depicted in FIGS. 9 and 10, the system 110 comprises a plurality of components, subsystems and/or modules operably coupled via appropriate circuitry and connections to enable the system 110 to perform the functions and operations herein described. The system 110 comprises suitable components necessary to interface with the hydraulic pump 114 and receive, store and execute appropriate computer instructions such as to implement a method for performing an action in accordance with embodiments of the present invention.

Figure 11:
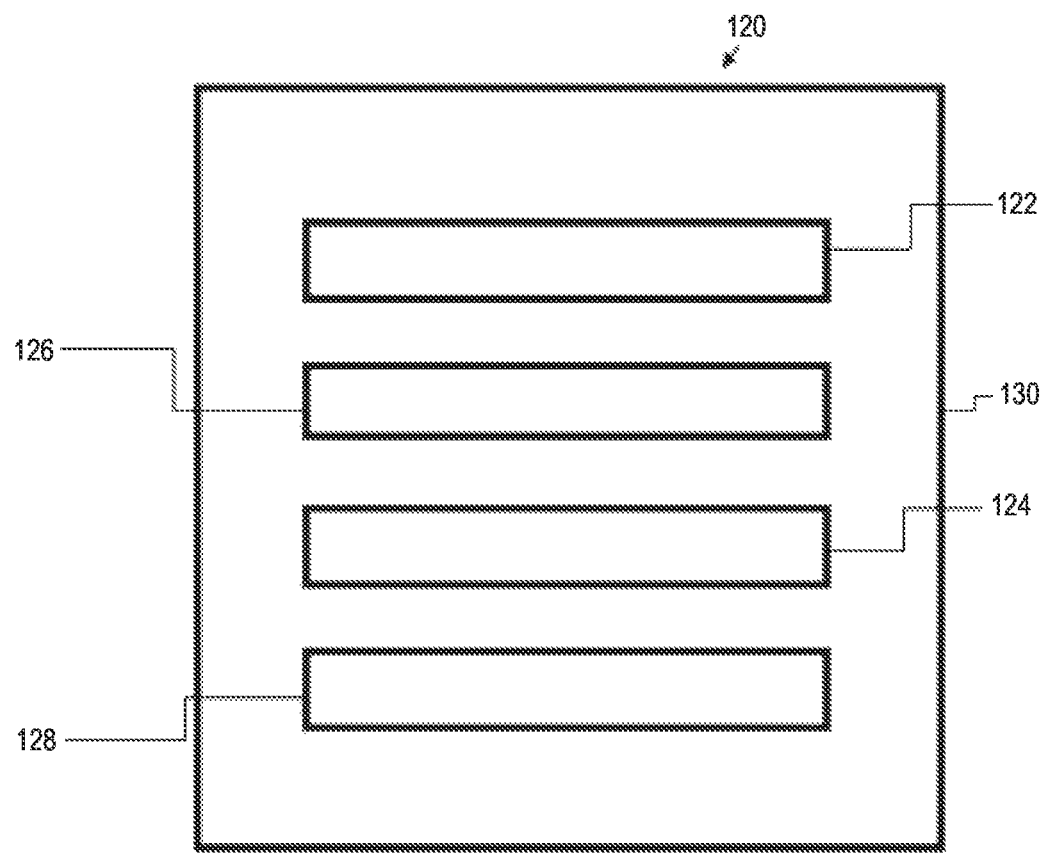
FIG. 11 depicts a schematic diagram of components of a control system of the embodiment of the system of FIG. 9.

Particularly, and as shown in FIGS. 9, 10, and 11, the system 110 comprises a tool 118 operable to perform at least the action; a control system implemented via computing means 120 which in the embodiment is based on Arduino™ technology and comprises a controller 122 and storage 124 for storing electronic program instructions for controlling the controller 122, and information and/or data; input/output means 126 for receiving input, and also providing output; and a source 128 for providing energy to power the system 110; all housed within a container or housing.

In embodiments of the invention, the energy source 128 comprises a 24V CAT™ Jump Start Receptacle, and/or 24V battery(s), connectable to provide power as required via appropriate hardware such as power cable(s) and alligator battery clips, for example.

In embodiments of the invention, the input/output means 126 comprises any data acquisition equipment, technology, and/or components as may be appropriate and/or required for the implementation.

In the embodiment, the housing 130 has the form of a control system and power supply case (in combination with the components housed therein thereby providing what may be referred to as a "control box" 131).

As will be described in further detail, the controller 122 is operable, under control of the electronic program instructions, to: receive input via the input/output means 126; process the input and, on the basis of the processing, control the tool 118 to perform the action.

The input/output means 126 comprises such components and circuitry as may be required, operably connected, to facilitate the operations described, including connectors for Wi-Fi, power (12V/24V), RJ45 data, and control/power cables, that may be provided so as to be accessed externally of the control system and power supply case 130.

As will be described in further detail, the tool 118 forms part of an interface 132 for operably coupling the system 110 to the other system (being the hydraulic pump 114 in the embodiment) to be acted upon.

Particularly, in the embodiment, the controller 122 is operable, under control of the electronic program instructions, to: receive input from the interface 132 (via the input/output means 126), the input comprising one or more details of the hydraulic pump 114; process the input to conduct an analysis of the hydraulic pump 114; generate an output, on the basis of the analysis, for controlling the interface 132 to perform the action on the hydraulic pump 114; and communicate the output, via the input/output means 126, to the interface 132 to control the interface 132 to perform the action on the hydraulic pump 114.

Particularly, in the embodiment, the controller 122 is operable to control and run applications for hydraulic tuning of the hydraulic pump 114.

In embodiments of the invention, the input comprises details. The details may comprise data and/or information of, associated with, and/or related to: the tool 118; the action(s) to be performed; and/or the system to be acted on (being the hydraulic pump 114 in the embodiment). The data and/or information may be obtained by one or more of capturing, retrieving, receiving, extracting, and identifying it, from one or more sources, which may include the tool 118 and the system to be acted on. The one or more sources of data may reside on the storage 124, and/or elsewhere, remote from the system 110.

The controller 122 comprises processing means in the form of a processor.

The storage 124 comprises read only memory (ROM) and random access memory (RAM).

The system 110 is capable of receiving instructions that may be held in the ROM or RAM and may be executed by the processor. The processor is operable to perform actions under control of electronic program instructions, as will be described in further detail below, including processing/executing instructions and managing the flow of data and information through the system 110.

In the embodiment, electronic program instructions for the system 110 are provided via a single standalone software application (app) or module which may be referred to as a hydraulic tuning app. In the embodiment described, the app is marketed under the trade mark HYDRATUNE™ and can be downloaded from a website (or other suitable electronic device platform) or otherwise saved to or stored on storage 124 of the system 110.

The system 110 also includes an operating system which is capable of issuing commands and is arranged to interact with the app to cause the system 110 to carry out actions including the respective steps, functions and/or procedures in accordance with the embodiment of the invention described herein. The operating system may be appropriate for the computing components of the system 110.

Figure 12:
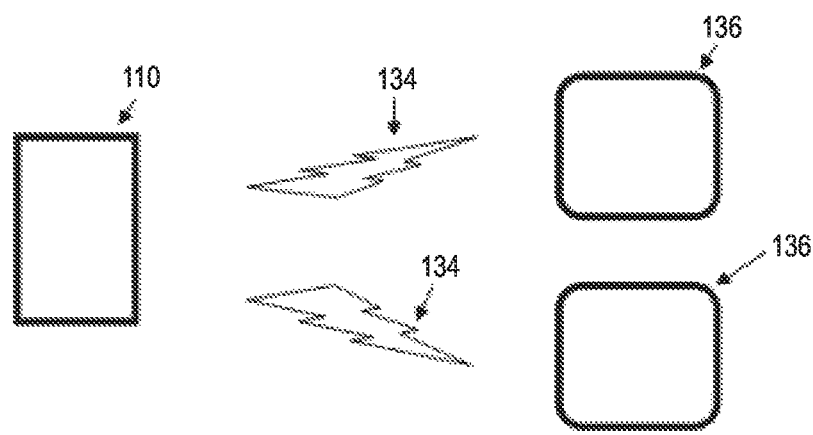
FIG. 12 depicts a simplified system diagram of the system of FIG. 9 communicating with remote devices.
Figure 13A:
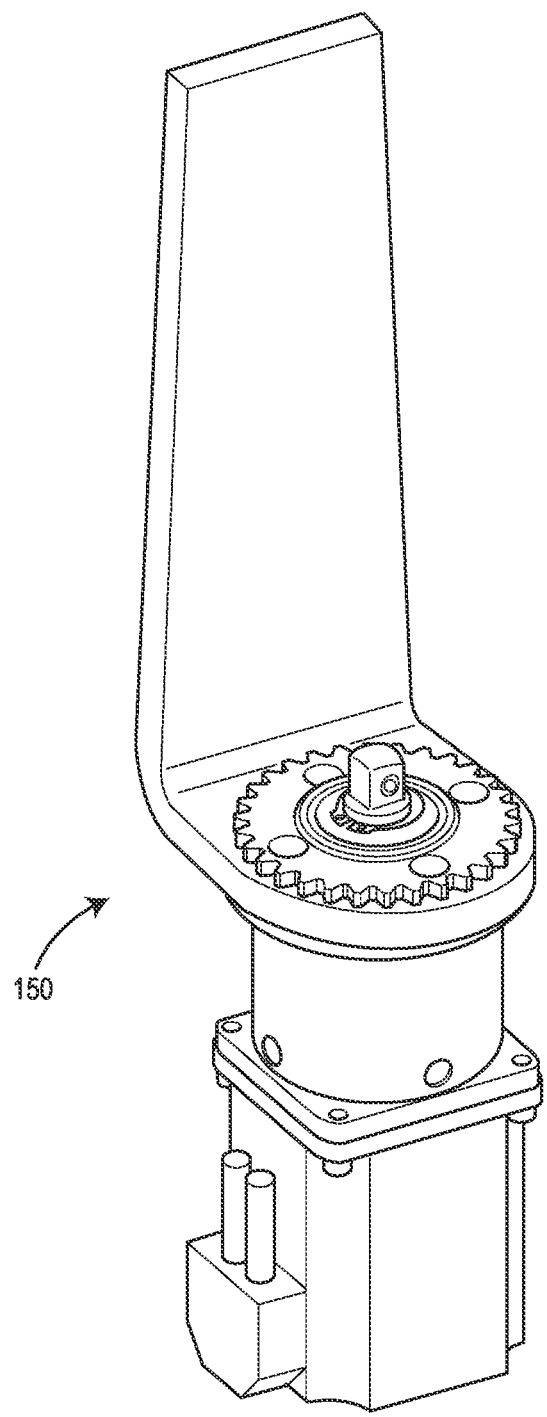
FIG. 13A depicts a perspective view of a valve actuator tool of the system of FIG. 9.
Figure 13B:
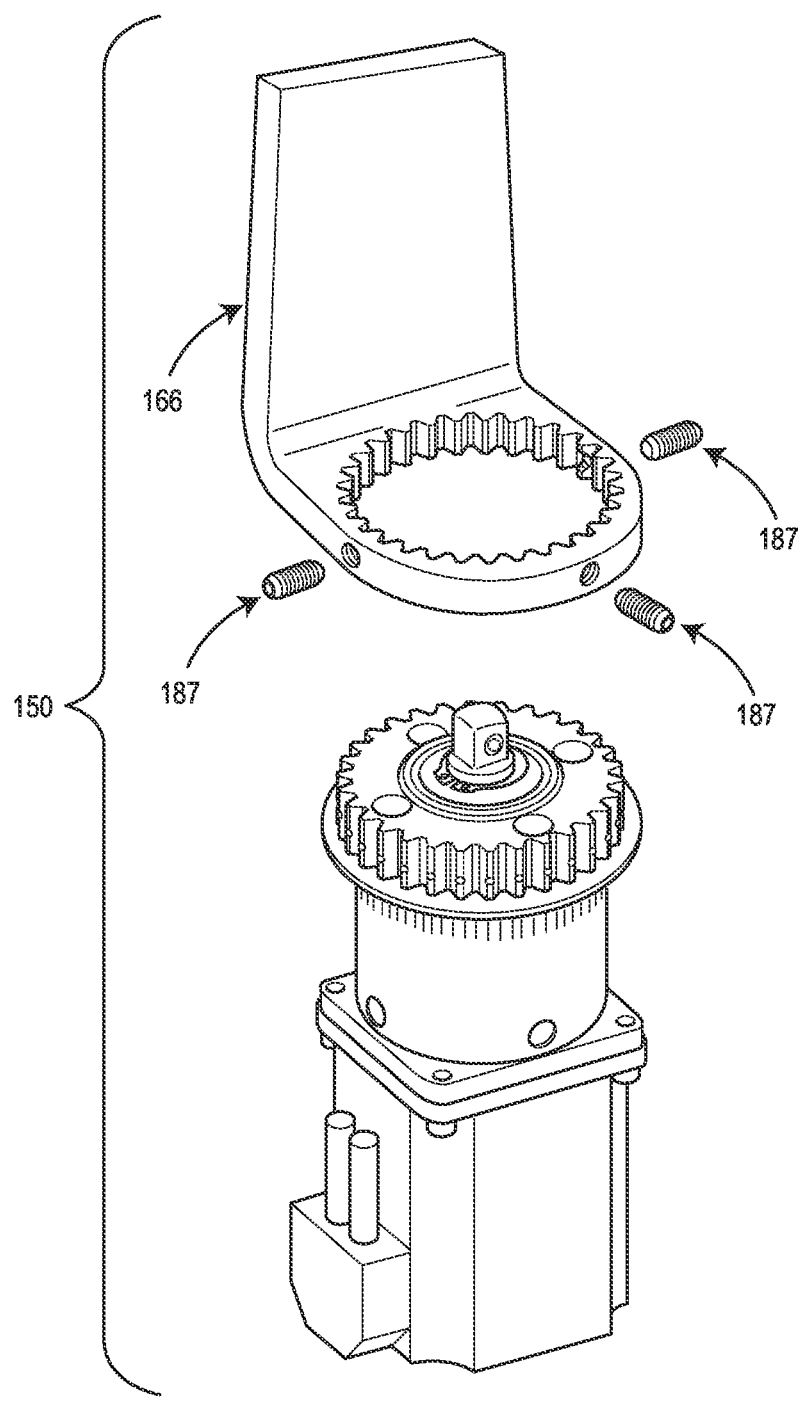
FIG. 13B depicts a perspective view to the valve actuator of FIG. 13A, exploded to show coupling to a reaction arm thereof.
Figure 13C:
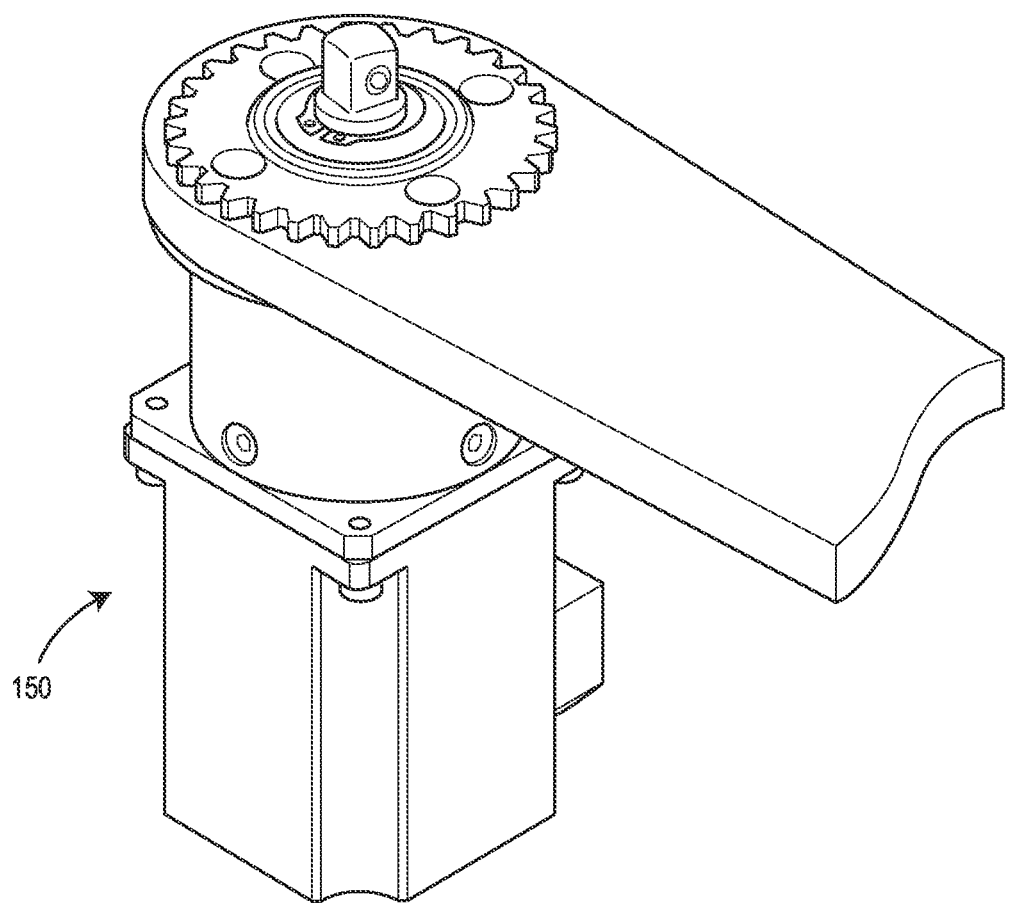
FIG. 13C depicts a perspective view of the valve actuator of FIG. 13A having an alternative reaction arm.
Figure 13D:
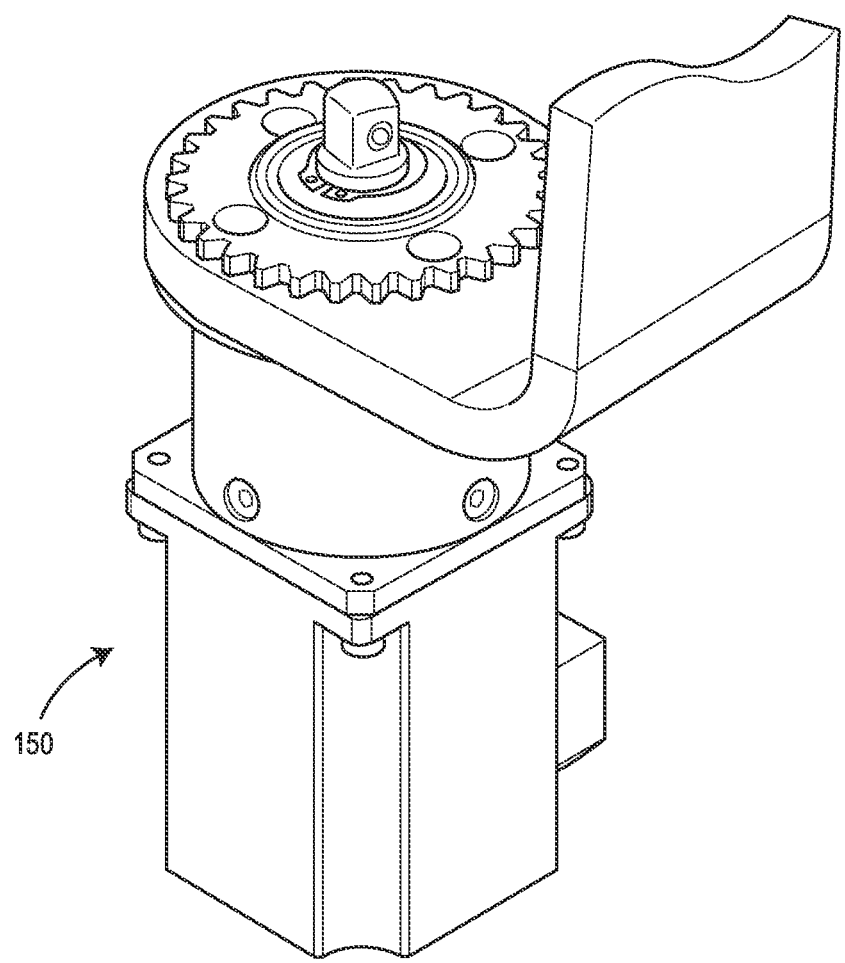
FIG. 13D depicts a perspective view of the valve actuator of FIG. 13A having an alternative reaction arm.
Figure 13E:
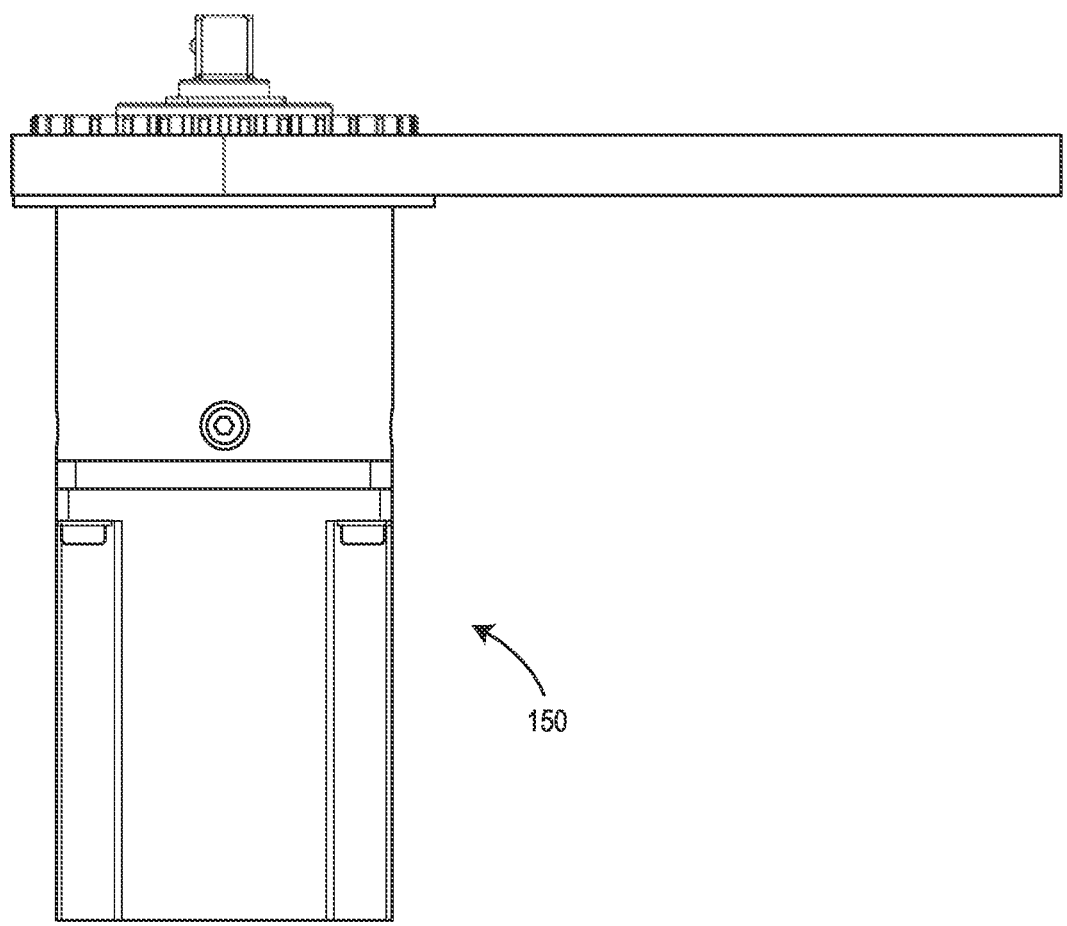
FIG. 13E depicts a side view of the valve actuator of FIG. 13C.
Figure 13F:
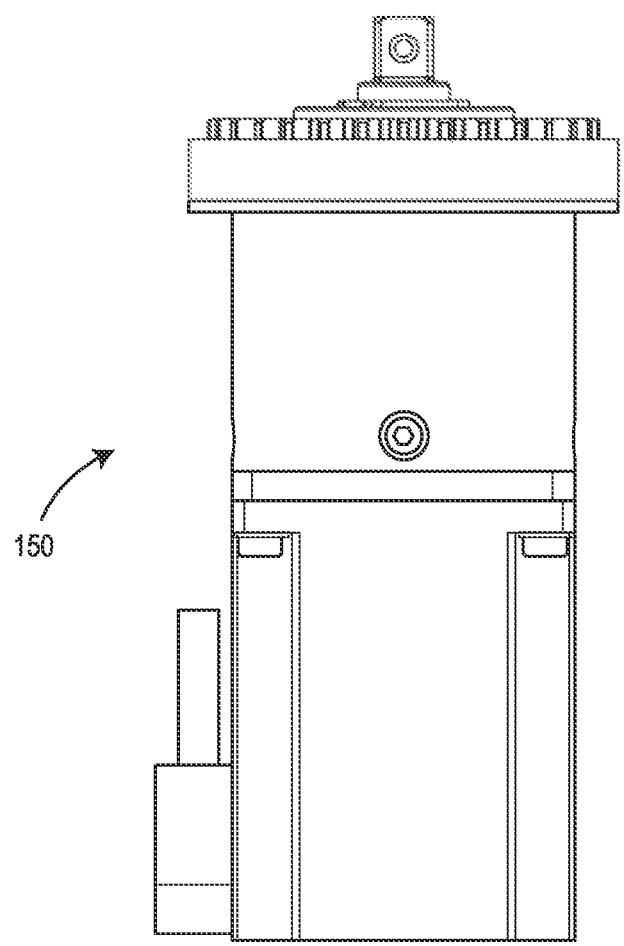
FIG. 13F depicts an end view of the valve actuator of FIG. 13C.
Figure 13G:
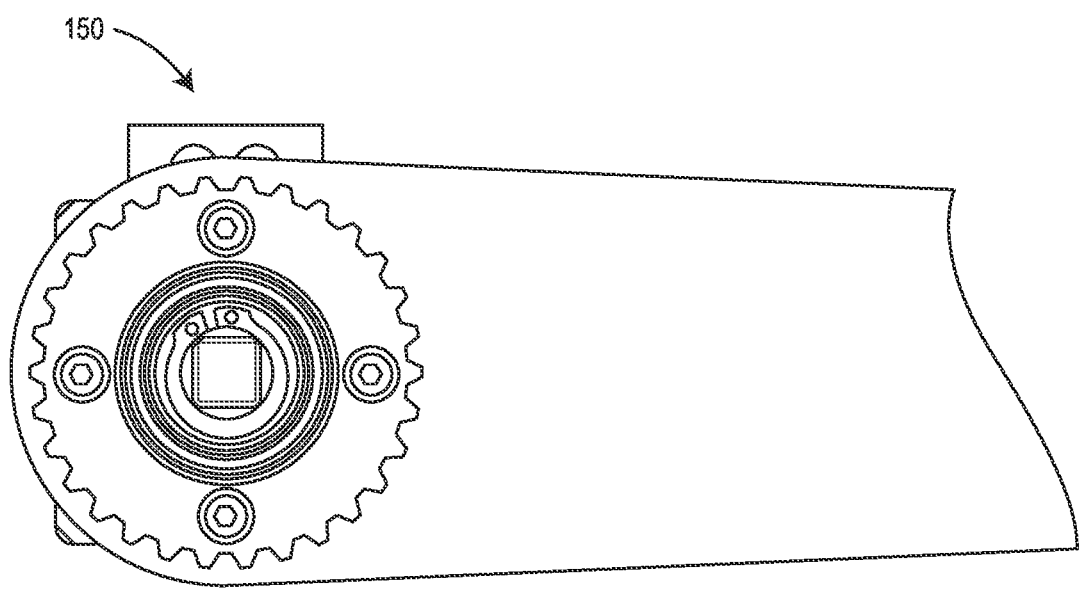
FIG. 13G depicts a top view of the valve actuator of FIG. 13C.
Figure 13H:
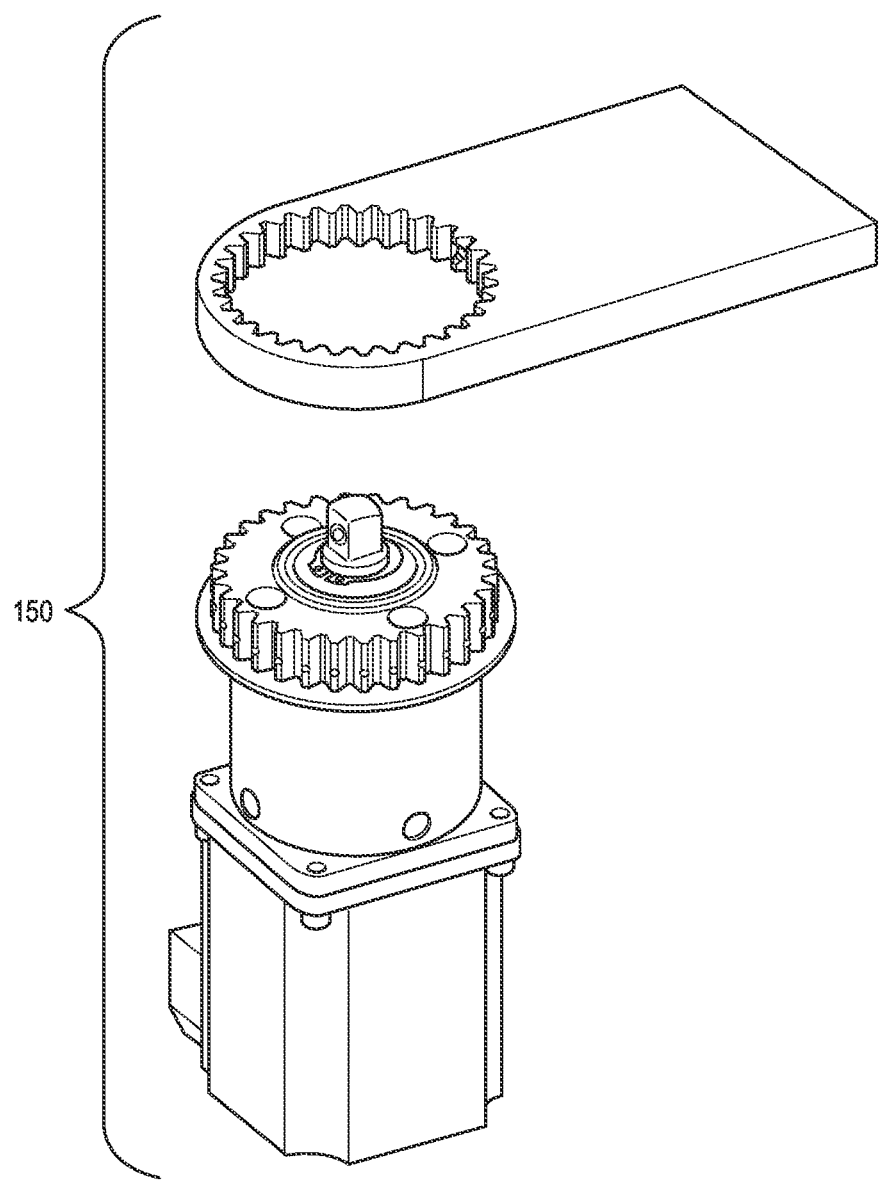
FIG. 13H depicts a perspective view of the valve actuator of FIG. 13C, exploded to show coupling to the reaction arm thereof.
Figure 13I:
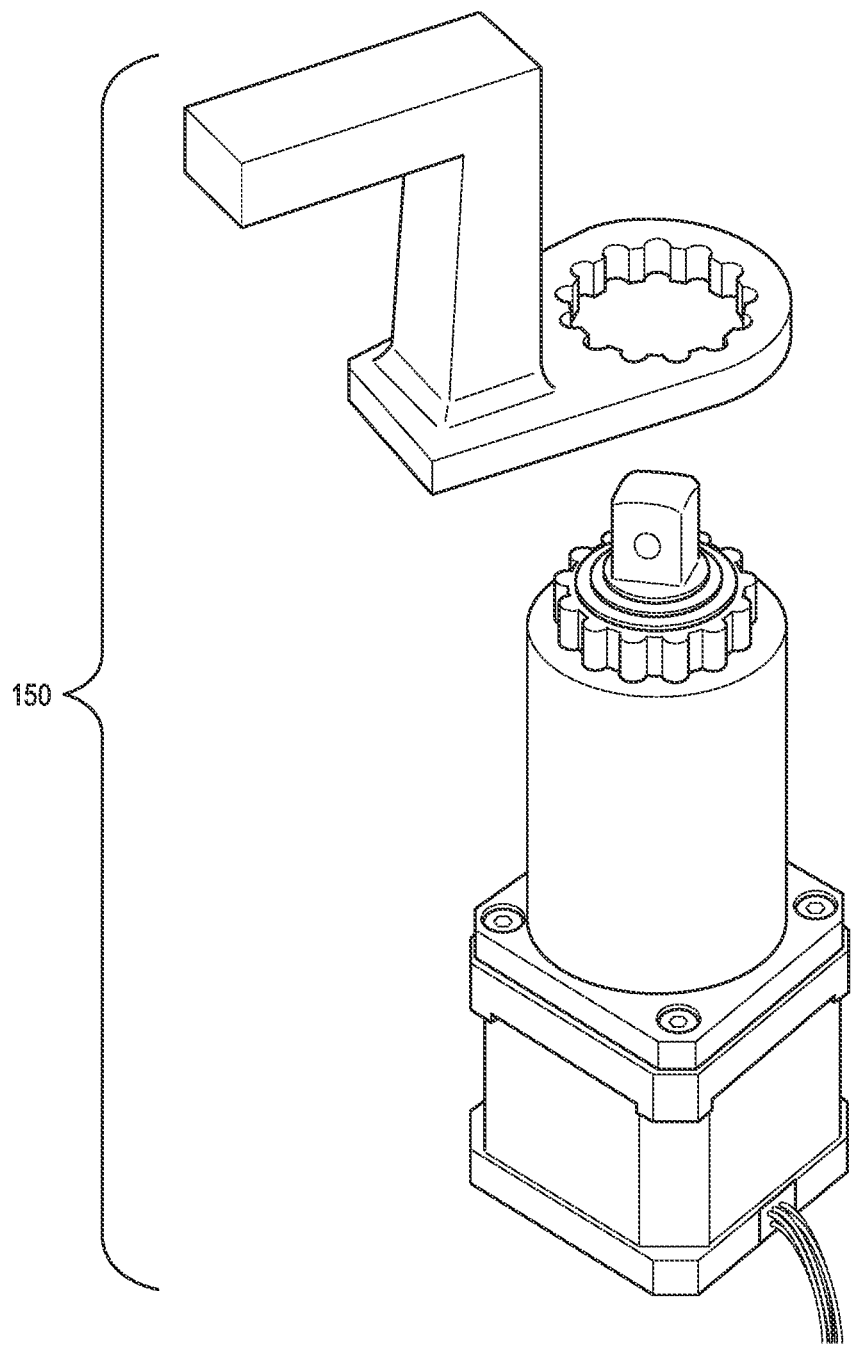
FIG. 13I depicts a perspective view of the valve actuator of FIG. 13A, having an alternative reaction arm.
Figure 14A:
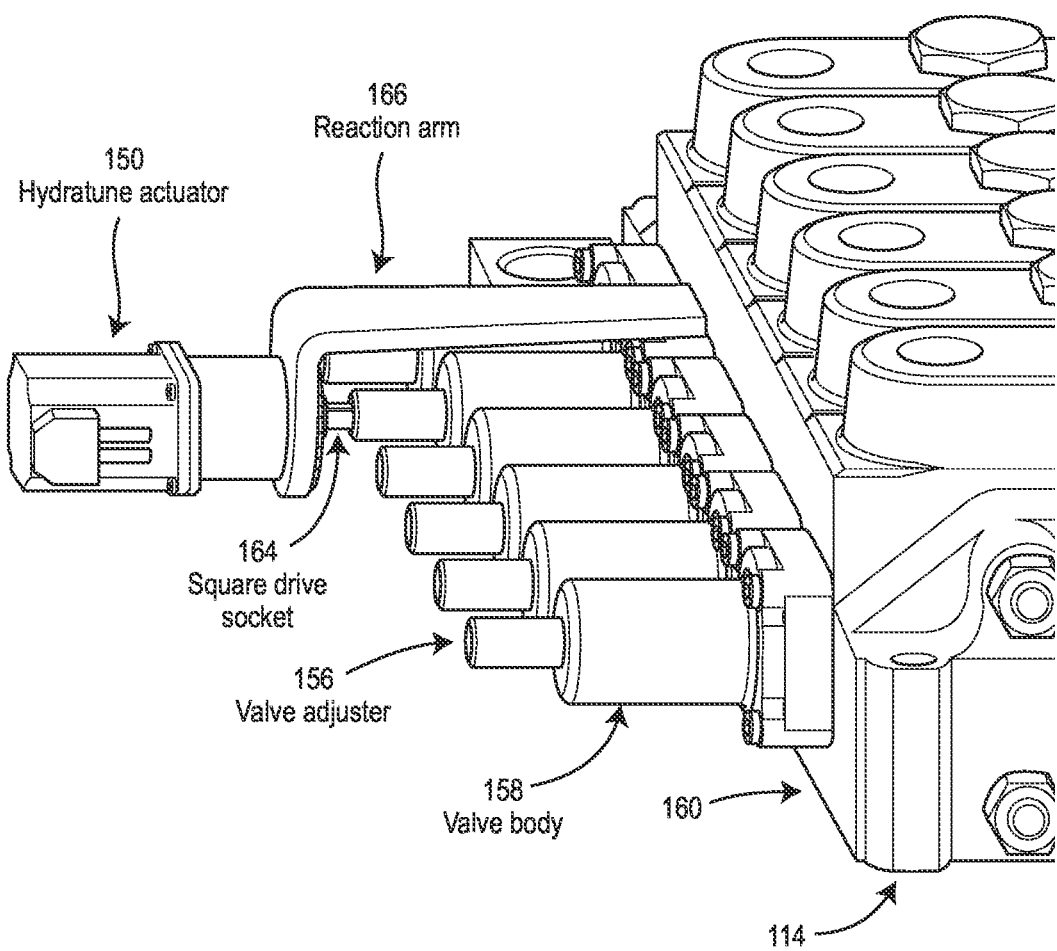
FIG. 14A depicts a perspective view of a valve actuator of the system of FIG. 9 operably connected, in a fitted or mounted position, to a valve adjustment point of a hydraulic pump.
Figure 14B:
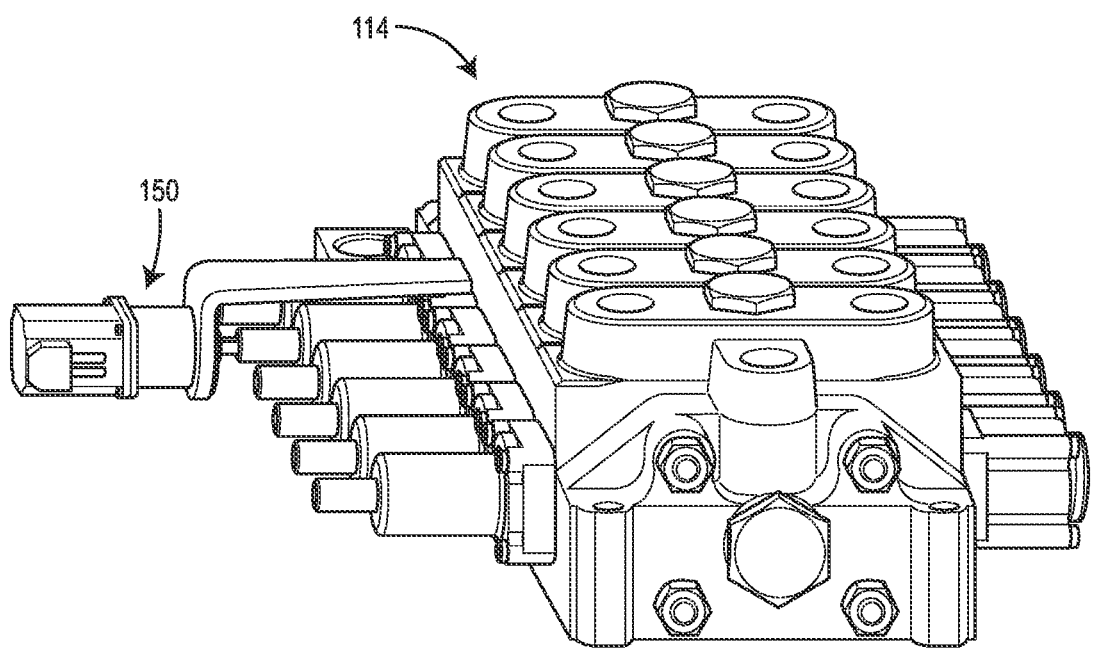
FIG. 14B depicts another perspective view of the valve actuator of the system of FIG. 9 operably connected, in a fitted or mounted position, to a valve adjustment point of a hydraulic pump.
Figure 15A:
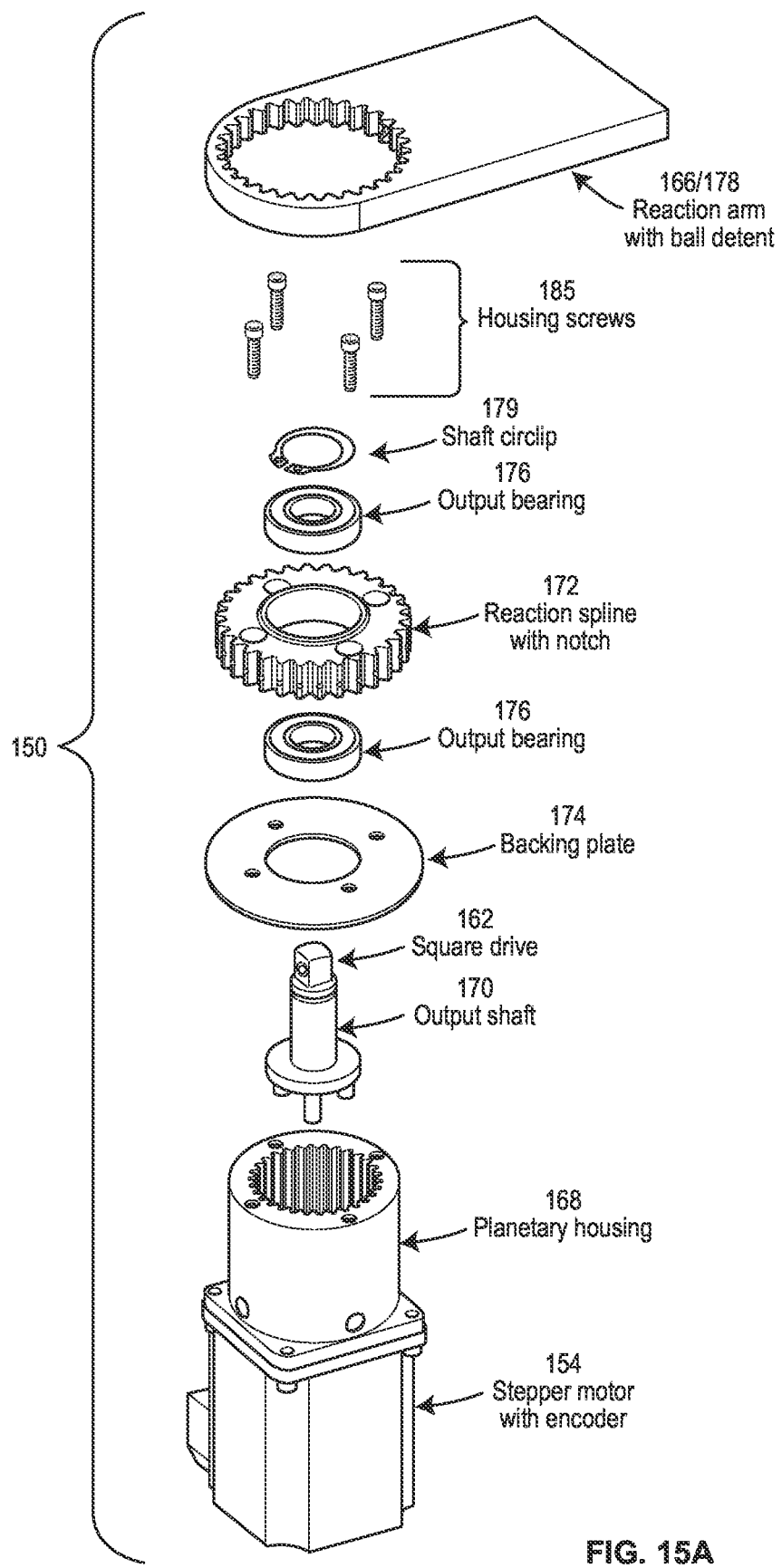
FIG. 15A depicts an exploded perspective view of components of the valve actuator of FIG. 13A.
Figure 15B:
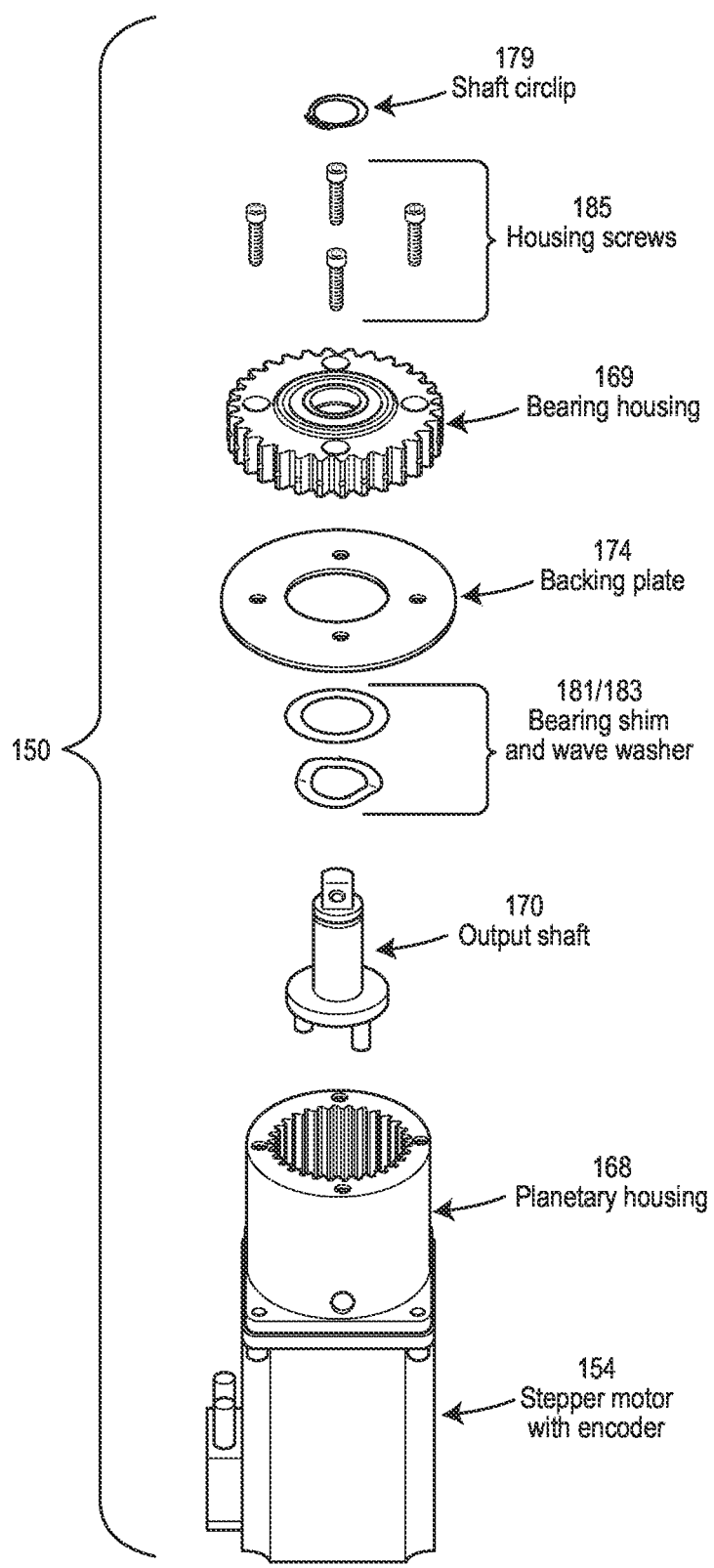
FIG. 15B depicts another exploded perspective view of components of the valve actuator of FIG. 13A.

As depicted in FIG. 12, the system 110 is operable to communicate via one or more communications link(s) 134, which may variously connect to one or more remote devices 136 such as servers, personal computers, terminals, wireless or handheld computing devices, landline communication devices, or mobile communication devices such as a mobile (cell) telephone. At least one of a plurality of communications link(s) 134 may be connected to an external computing network through a telecommunications network.

In the embodiment described, the remote devices 136 include a mobile communication device 138 owned and/or operated by the technician 116. In the embodiment, the mobile communication device 138 comprises computing means such as a personal, notebook or tablet computer such as that marketed under the trade mark IPAD® or IPOD TOUCH® by Apple Inc, or by other provider such as Hewlett-Packard Company, or Dell, Inc, for example, or other suitable device. In alternative embodiments, the mobile communication device 138 may comprise a smartphone such as that marketed under the trade mark PHONE® by Apple Inc, or by other provider such as Nokia Corporation, or Samsung Group, having Android, WEBOS, Windows, or other Phone app platform.

In the embodiment described, communication between the mobile communication device 138 and the control system components of the system 110 contained within the control system and power supply case 130, including the generation, transmission and receiving of commands and signals, is implemented via Wi-Fi or wired Ethernet IP signal (via LAN cable as appropriate), the input/output means 126 comprising such components and circuitry as necessary and operably connected to facilitate such operation.

Electronic instructions or programs for the computing components of the system 110 can be written in any suitable language, as are well known to persons skilled in the art. In embodiments of the invention, the electronic program instructions may be provided as stand-alone application(s), as a set or plurality of applications, via a network, or added as middleware, depending on the requirements of the implementation or embodiment.

In embodiments of the invention, the software may comprise one or more modules, and may be implemented in hardware. In such a case, for example, the modules may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

The computing means can be a system of any suitable type, including: a programmable logic controller (PLC); digital signal processor (DSP); microcontroller; personal, notebook or tablet computer, or dedicated servers or networked servers.

The processor can be any custom made or commercially available processor, a central processing unit (CPU), a data signal processor (DSP) or an auxiliary processor among several processors associated with the computing means. In embodiments of the invention, the processing means may be a semiconductor based microprocessor (in the form of a microchip) or a macroprocessor, for example.

The storage can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The respective storage may incorporate electronic, magnetic, optical and/or other types of storage media. Furthermore, the respective storage can have a distributed architecture, where various components are situated remote from one another, but can be accessed by the processing means. For example, the ROM may store various instructions, programs, software, or applications to be executed by the processing means to control the operation of the system 110 and the RAM may temporarily store variables or results of the operations.

The use and operation of computers using software applications is well-known to persons skilled in the art and need not be described in any further detail herein except as is relevant to the present invention.

Furthermore, any suitable communication protocol can be used to facilitate connection and communication between any subsystems or components of the system 110, and other devices or systems, including wired and wireless, as are well known to persons skilled in the art and need not be described in any further detail herein except as is relevant to the present invention.

Where the words "store", "hold" and "save" or similar words are used in the context of the present invention, they are to be understood as including reference to the retaining or holding of data or information both permanently and/or temporarily in the storage means, device or medium for later retrieval, and momentarily or instantaneously, for example as part of a processing operation being performed.

Additionally, where the terms "system", "device", and "machine" are used in the context of the present invention, they are to be understood as including reference to any group of functionally related or interacting, interrelated, interdependent or associated components or elements that may be located in proximity to, separate from, integrated with, or discrete from, each other.

Furthermore, in embodiments of the invention, the word "determining" is understood to include receiving or accessing the relevant data or information.

The mobile communication device 138 comprises a display 140 for displaying a user interface, and the controller 122 is operable, under control of the electronic program instructions, to generate an output on the basis of the processing, and to communicate the output via the display 140.

In the embodiment of the invention, the display 140 and the user interface are integrated in a touchscreen 142. In alternative embodiments these components may be provided as discrete elements or items.

The touchscreen 142 is operable to sense or detect the presence and location of a touch within a display area of the mobile communication device 138. Sensed "touchings" of the touchscreen 142 (by the technician 116, for example) are inputted to the mobile communication device 138 as commands or instructions and communicated to the controller 122 of the system 110. It should be appreciated that user input means is not limited to comprising a touchscreen, and in alternative embodiments of the invention any appropriate device, system or machine for receiving input, commands or instructions and providing for controlled interaction may be used, including, for example, a keypad or keyboard, a pointing device, or composite device, and systems comprising voice activation.

Input to the system 110 may also be received via at least one sensor which is part of a sensor system or a set of sensors 144 of the system 110, and may be considered to comprise part of the input/output means 126. Individual sensors within the set of sensors 144 are operable to monitor, sense, and capture or otherwise gather or measure sensor data and/or information associated with and/or relating to one or more characteristics, properties and parameters of the system 110, the surrounding environment, the action(s) to be performed, or components, systems or devices associated therewith or coupled thereto, such as for example, the hydraulic pump 114, as will be described in further detail.

For example, the set of sensors 144 is operable to sense and gather sensor data relating to a state of the system 110 and/or a state of the environment surrounding the system 110.

In the embodiment described, the set of sensors comprise a sensor in the form of a hydraulic pressure transducer 146, operably connected to receive power supply and communicate with the control system components of the system 110 contained within the control system and power supply case 130, via a power and control cable or lead 148 leading to the input/output means 126 thereof.

Particularly, the hydraulic pressure transducer 146 is operable to take hydraulic pressure readings from a hydraulic circuit (of the hydraulic pump 114) being adjusted, and communicate the readings to the control system components of the system 110 contained within the control system and power supply case 130 via the lead 148 and appropriate electronics. The system 110 is then operable to communicate the readings to the mobile communication device 138, allowing for pressure feedback to the technician 116 via the touchscreen 142.

Alternative embodiments of the invention may comprise additional and/or alternative sensors in the set of sensors 144, including, for example, a hydraulic flow sensor and/or a temperature sensor, and/or other sensors as may be appropriate for the implementation of the invention and the action(s) being performed.

One or more sensors of the set of sensors 144 may be integrated with, or operably coupled to, the system 110.

The controller 122 is operable, via execution of applications such as the app, to collect and process inputs pertinent to the analysis being conducted and the action to be performed, including operating commands input by the technician 116 via the user interface 142 and input arising from sensors of the set of sensors 144.

The system 110 comprises operably connected/coupled components facilitating performance and operations as described, including appropriate computer chips (integrated circuits), transceiver/receiver antennas, and software for the sensory technology being used.

As hereinbefore described, the system 110 is operable to allow a technician 116 to perform hydraulic system testing and adjustments actions or operations on, or in respect of, the hydraulic pump 114.

To achieve this, in the embodiment, tool 118 is a first tool of a plurality of tools, comprising: a universal hydraulic valve actuator 150 (which may also be referred to as a valve turning motor); and a remote hydraulic flow meter 152. Together, the actuator 150 and the flow meter 152 form the interface 132 operably coupling the system 110 to the hydraulic pump 114.

The actuator 150 allows the technician 116 to remotely actuate hydraulic system valves of the hydraulic pump 114.

Referring to FIGS. 13A to 15B, in the embodiment, the valve actuator 150 comprises a drive or driving means in the form of a closed loop gear reduction stepper motor 154 designed and operable to allow fitment or mounting to any corresponding hydraulic valve adjustment point (such as a valve adjustment point 156 provided on a valve body 158 of a valve 160 of the hydraulic pump 114, or to a spool valve relief that requires adjustment, for example) by utilising a square drive output 162 provided with square drive socket tooling 164.

In the embodiment, the valve actuator 150 is provided with a removable splined reaction arm 166 or bracket operable for and allowing the valve actuator 150 to be firmly mounted to any hydraulic valve body by mounting various shaped reaction arms or brackets (i.e. replacing one reaction arm or bracket with another, as appropriate) to suit the application.

In the embodiment, the valve actuator 150 comprises the following components:
- the stepper motor 154 with built in encoder operable for and to allow closed loop control;
- planetary gear reduction contained in a planetary housing 168;
- an output shaft 170 with standard square drive (being ⅜ inch in the embodiment, but may be different in other embodiments, such as ¼ or ½ inch, for example) to provide the square drive output 162 to allow use of standard square drive tooling (such as the socket tooling 164);
- a notched reaction spline 172 (30-spline in the embodiment) operable for and allowing mounting and indexing of various reaction arms 166 to suit the application;
- a backing plate 174 operable for and to ensure that the reaction arm 166 is correctly installed on the reaction spline 172;
- output bearings 176 operable for and to handle additional side loading created by mounting the valve actuator 150 by the output shaft 170; and
- a ball detent 178 provided on the reaction arm 166 operable for and to secure it in position on the reaction spline 172.

The valve actuator 150 is operably connected to receive power supply and communicate with the control system components of the system 110 contained within the control system and power supply case 130, via a power and control cable or lead 180 leading to the input/output means 126 thereof.

In embodiments of the invention, the valve actuator 150 may be implemented by taking an off the shelf closed loop stepper motor/encoder with integrated planetary gear box and modifying it by providing the following replacement components: replacement output shaft for planetary gearbox with a ⅜" square drive and ball detent for use with standard ⅜" square drive tooling; replacement gearbox end plate with a 30-tooth spline and ball detent to allow attaching and indexing of a reaction element; and various shapes of reaction elements with matching 30-tooth spline to allow universal mounting of the valve actuator in multiple configurations.

Particularly, in embodiments of the invention, the valve actuator 150 may be a tool comprising a modified version of the Nema™ 23 stepper motor/gearbox series, (https://www.omc-stepperonline.com/download/23HS22-2804D-PG15-E1000.pdf) (https://www.omc-stepperonline.com/nema-23-closed-loop-geared-stepper-156mm-gear-raio-151-encoder-1000cpr-23hs22-2804d-pg15-e1000.html), and may be designed with a modified output shaft 170 with a ⅜" square drive 162 (square drive output instead of keyway coupling) for standard tooling and a modified bearing housing 169 with a 30-spline 172 profile (external) to work with the reaction arm 166. The external spline profile allows for operable coupling with the interchangeable reaction arm 166, which may be made specific for each intended use. In embodiments, the valve actuator 150 tool may be certified for safe use with the largest combination of 47:1 gearbox with 1.2 Nm stepper (max output: 56.4 Nm). In embodiments, the following relevant Australian Standards may be met: AS1170—Minimum design load on structures; AS4100—Steel structures; and AS1664—Aluminium structures.

Figures 16A, 16B:
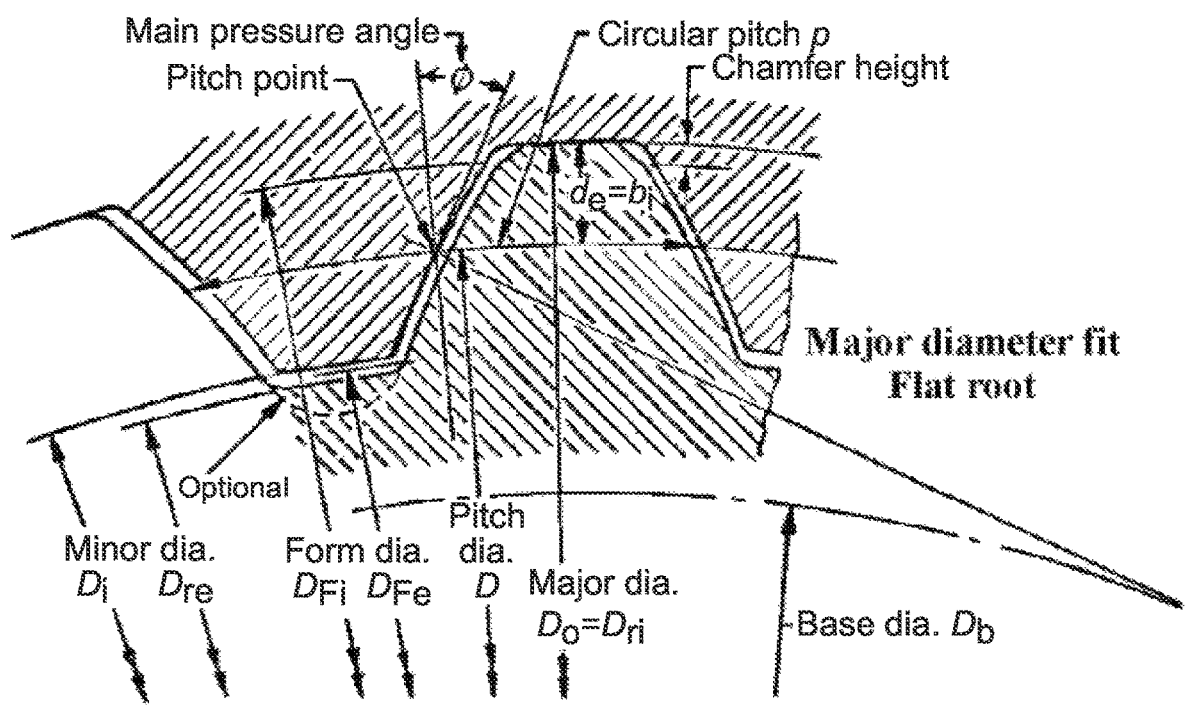
FIG. 16A depicts a profile of a spline of the valve actuator of FIG. 13A.
FIG. 16B depicts a table of specifications of the spline of the valve actuator of FIG. 13A.

Referring to FIGS. 16A and 16B, in the embodiment, the spline profile comprises a circular external spline incorporated into the bearing housing 169 and an internal circular spline on the reaction arm 166. For both parts, the spline profile extends the entire thickness of the component, advantageously allowing for ease of manufacture.

Such a spline profile may ensure a tight fit and good torque transfer, for example: ANSI B92.1—Major diameter fit, flat root. http://www.tandwiel.info/en/gears/internal-and-external-spline-teeth/

Figures 17A, 17B, 18:
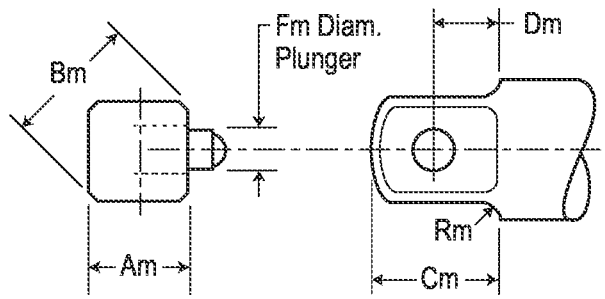
FIG. 17A depicts a square drive of the valve actuator of FIG. 13A.
FIG. 17B depicts a table of standard size and dimensions for square tool drives.
FIG. 18 depicts specifications for bearings of the valve actuator of FIG. 13A.
Figure 21A:
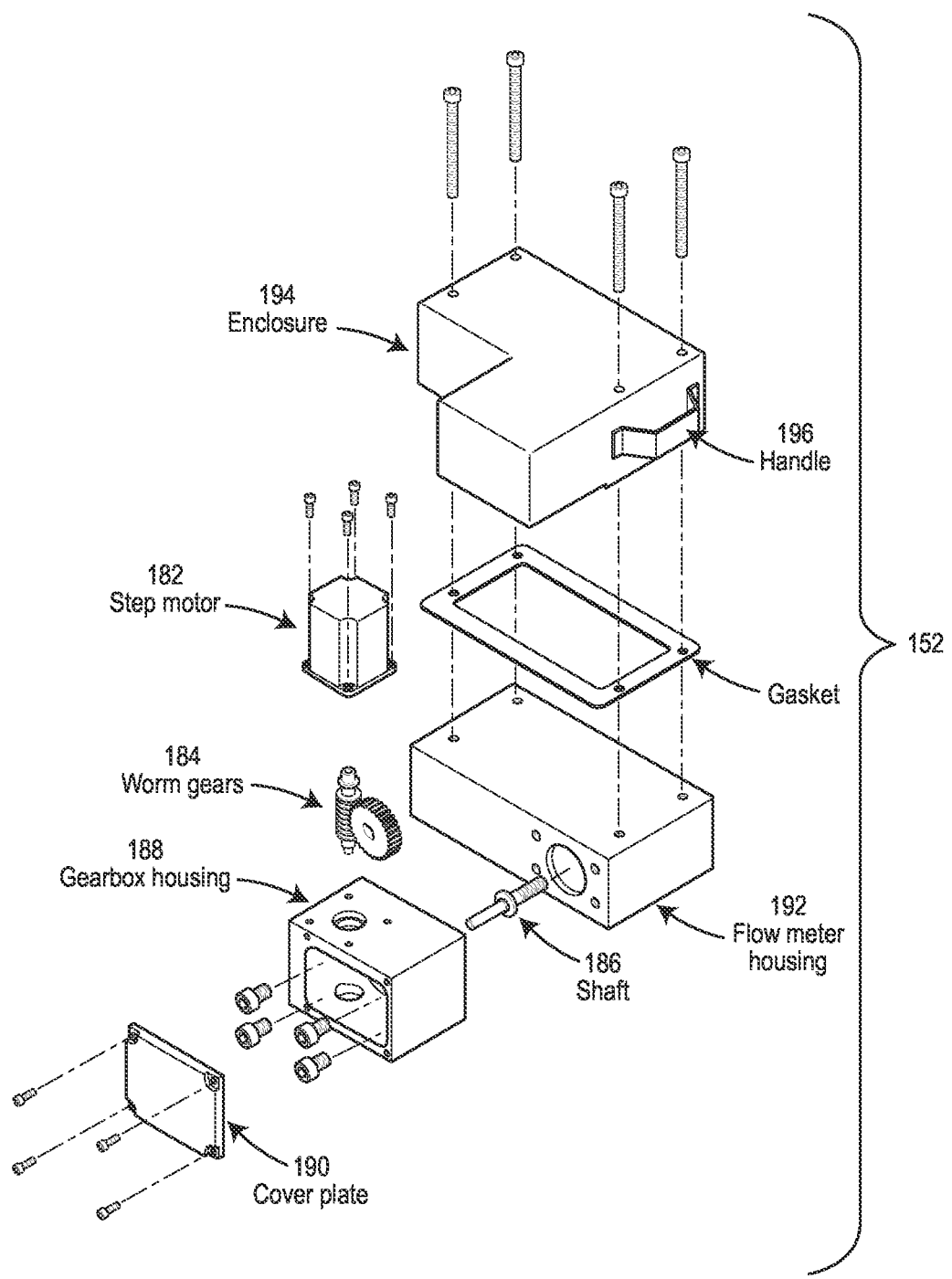
FIG. 21A depicts an exploded isometric view of components of a flow meter of the system of FIG. 9.
Figure 21B:
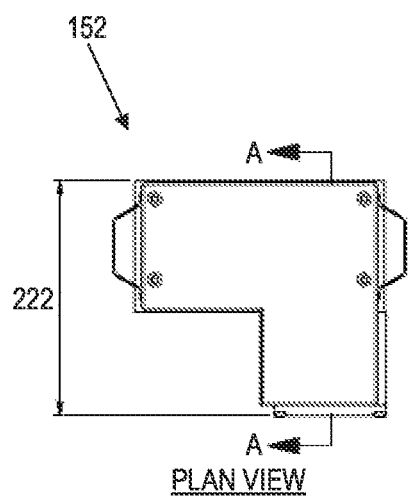
FIG. 21B depicts a plan view of components of the flow meter of FIG. 21A.
Figure 21C:
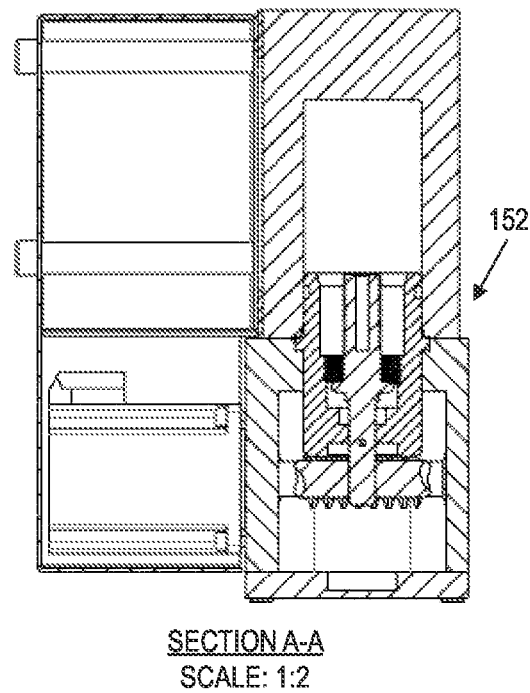
FIG. 21C depicts a section view of components of the flow meter of FIG. 21A.
Figure 21D:
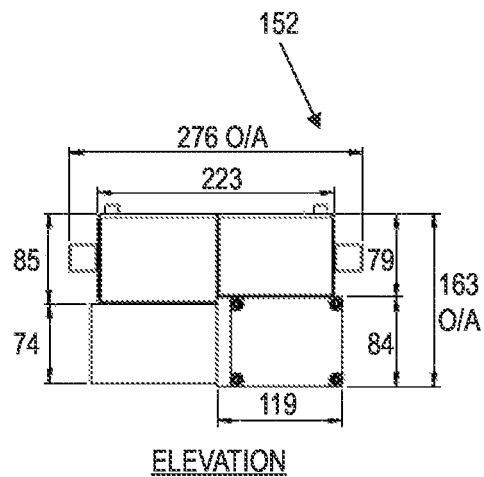
FIG. 21D depicts an elevation view of components of the flow meter of FIG. 21A.
Figure 21E:
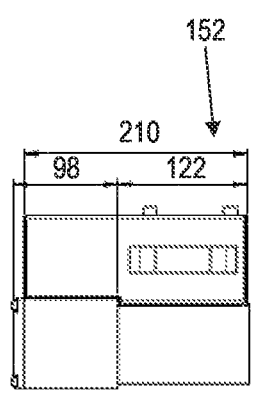
FIG. 21E depicts a side view of components of the flow meter of FIG. 21A.
Figure 22A:
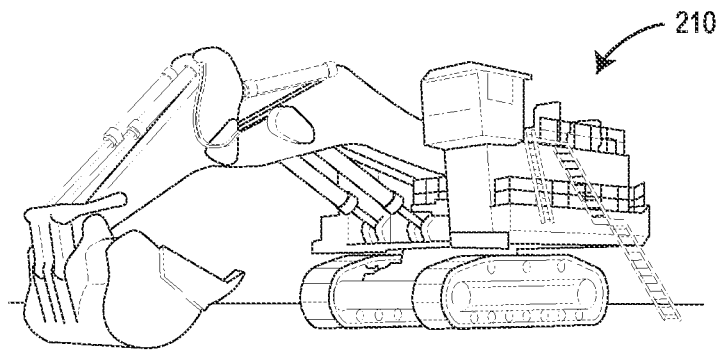
FIGS. 22A, 22B, and 22C depict examples of existing large mining Excavators/Loading Shovels.
Figure 22B:
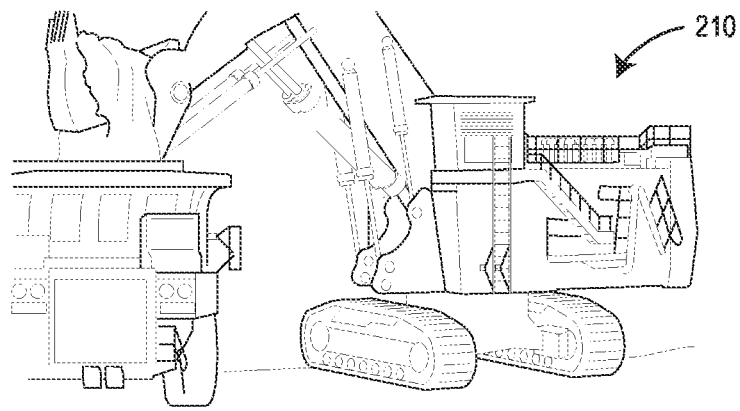
Figure 22C:
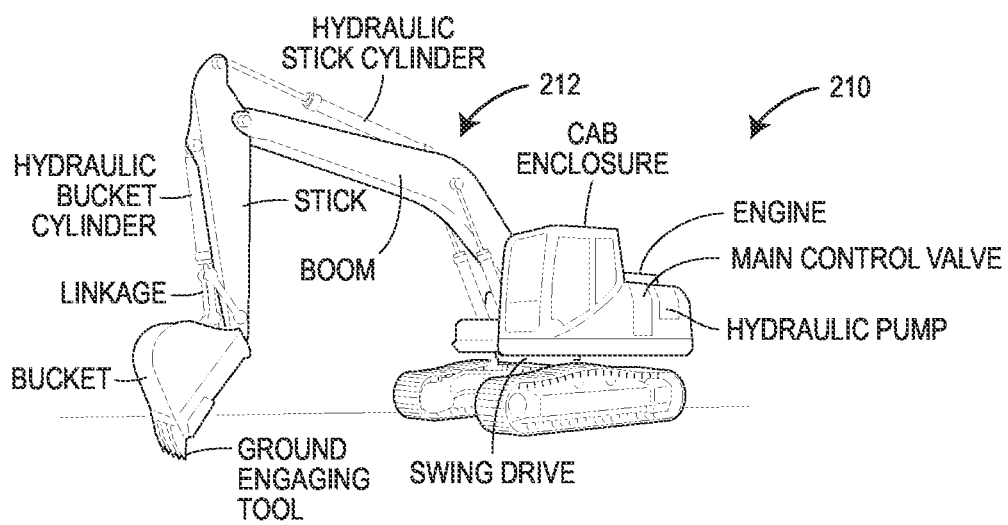
Figure 22D:
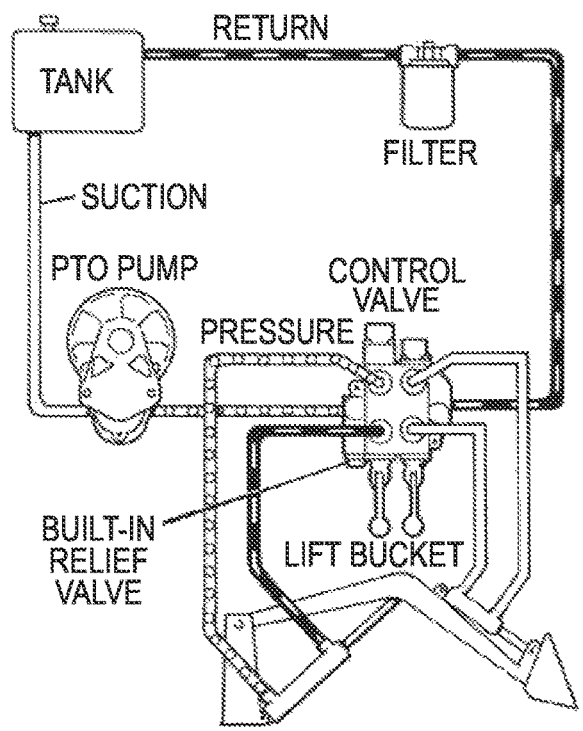
FIGS. 22D and 22E depict examples of hydraulic system control circuits of the Excavators/Loading Shovels of FIGS. 22A, 22B, and 22C.
Figure 22E:
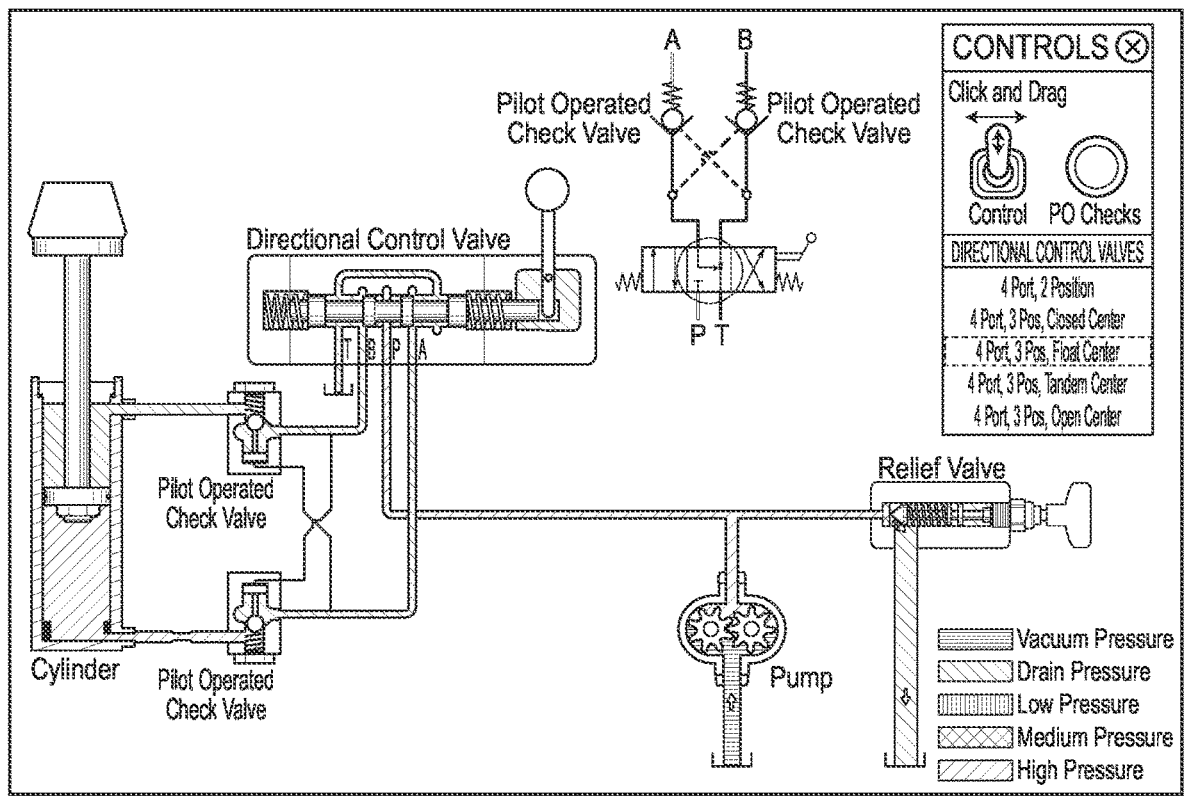
Figure 22F:
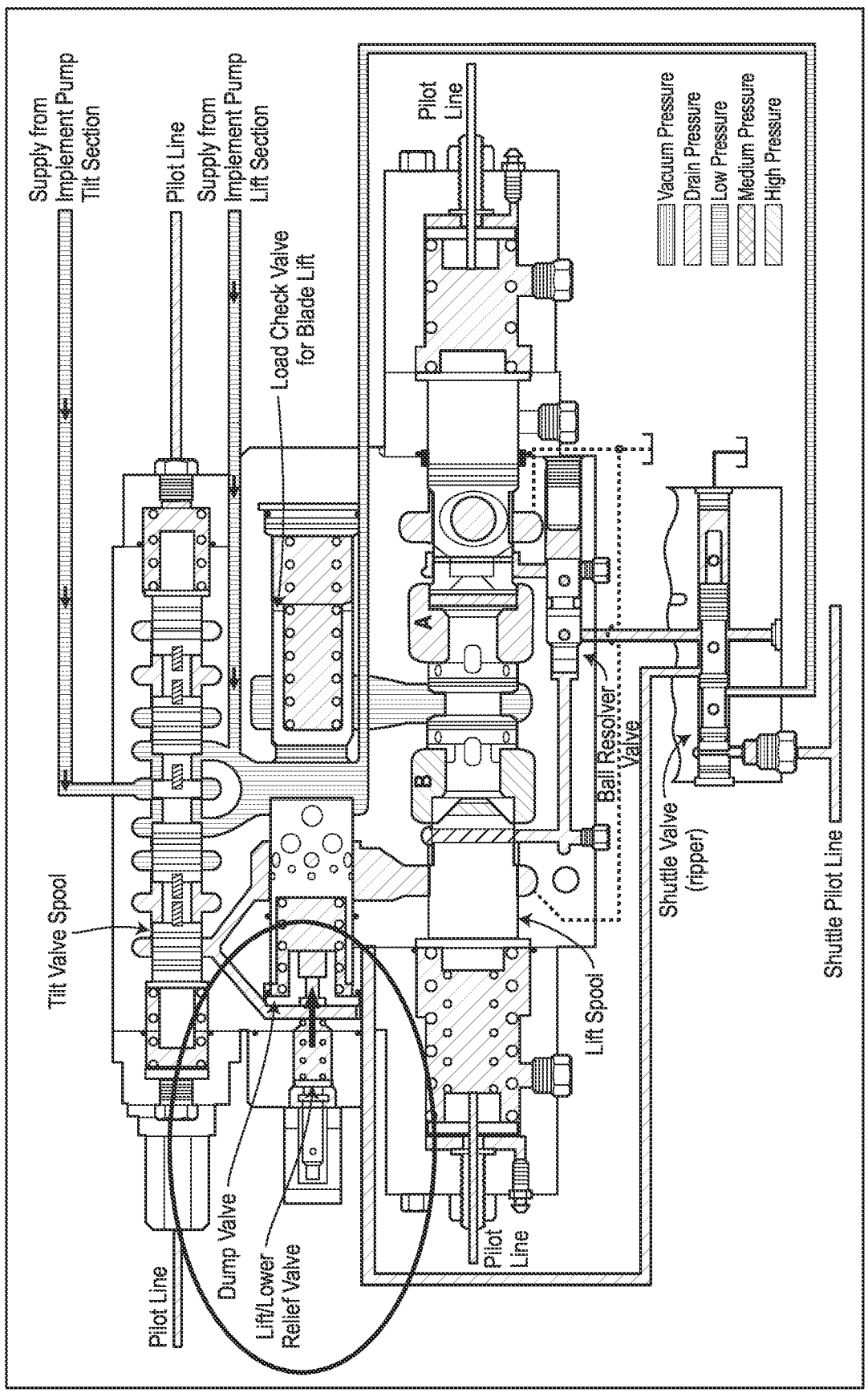
FIG. 22F depicts an example of Spool Valve Circuit Reliefs of the hydraulic system control circuits.

Referring to FIGS. 17A and 17B, the standard size and dimensions for American square tool drives per ASA B5.38, used in embodiments of the invention, may be found at: https://www.engineersedge.com/hardware/square-drive-tools.htm.

Referring to FIG. 18, in the embodiment, the bearings 176 were designed alongside the output shaft 170. The bearings 176 are required to sleeve over the output shaft 170, which exceeded the original bearing internal diameter (as a consequence of the modification). Taking the minimum shaft outside diameter of 12.7 mm, the next bearing size to suit this was selected, for the embodiment, as follows: SKF, 6002-2RHS. http://www.skf.com/group/products/bearings-units-housings/ball-bearings/deep-groove-ball-bearings/deep-groove-ball-bearings/index.html?designation=6002-2RSH.

Due to an increased output shaft 170 diameter (as a consequence of the modification), a new circlip 179 was required as part of the modification. The corresponding circlip specified in the embodiment is: D1400-0150. http://www.circlips.com.au/contentblank.php?sec=products&sec2=circlips&sec3=d1400

Due to an increased output shaft 170 diameter (as a consequence of the modification), a new curved spring (wave) washer 181 was required. Some suitable wave washers to suit an M15 include, for example:
  https://www.minibearings.com.au/store/item/w0159t022003w3c/
  https://www.alibaba.com/product-detail/carbon-steel-elastic-wave-spring-washer_60806889691.html?spm=a2700.7724857.normalList.37.6185500dMIIgsq
  https://www.aliexpress.com/item/free-shipping-100pcs-M6-304-Stainless-Steel-Spring-Washer-Split-Lock-Washers/

Due to the change in curved spring washer, the inside diameter of the bearing shim washer 183 needs to be updated accordingly. Due to the unique sizing, the washer was custom made to the following specifications, in the embodiment: ID=23.5 mm; OD=36.9 mm; T=0.125 mm.

Four top screws 185 attaching the bearing housing 169 to the planetary gearbox are able to be retained. These may be, for example, of specification: M4×10 Cylindrical Flanged Socket Head Cap Screw.

Referring to FIGS. 19A, 19B, and 19C, in the embodiment, for a ⅜th square drive, as per ASA B5.38 specifications, the ball plunger is required to be a maximum of Ø4 mm. Suitable ball plungers may meet the following specifications: https://www.oceaniaic.com.au/products/indexing-elements/series/gn-614/.Body: ANSI 305 stainless steel. Standard execution: AISI 420C hardened stainless steel ball, AISI 631 stainless steel spring.

Referring to FIGS. 20A, 20B, and 20C, the spline reaction arm attachment comprises a plurality of spring plungers. In the embodiment, three spring plungers 187 are utilised in this regard to seek to ensure that the assembly stays together. Suitable spring plungers may meet the following specifications: https://www.oceaniaic.com.au/products/indexing-elements/series/gn-615-3/. Threaded body: AISI 303 stainless steel, screwdriver slotted head. Standard execution: Hardened stainless steel ball, stainless steel spring. Internal hexagon.

Figure 7:
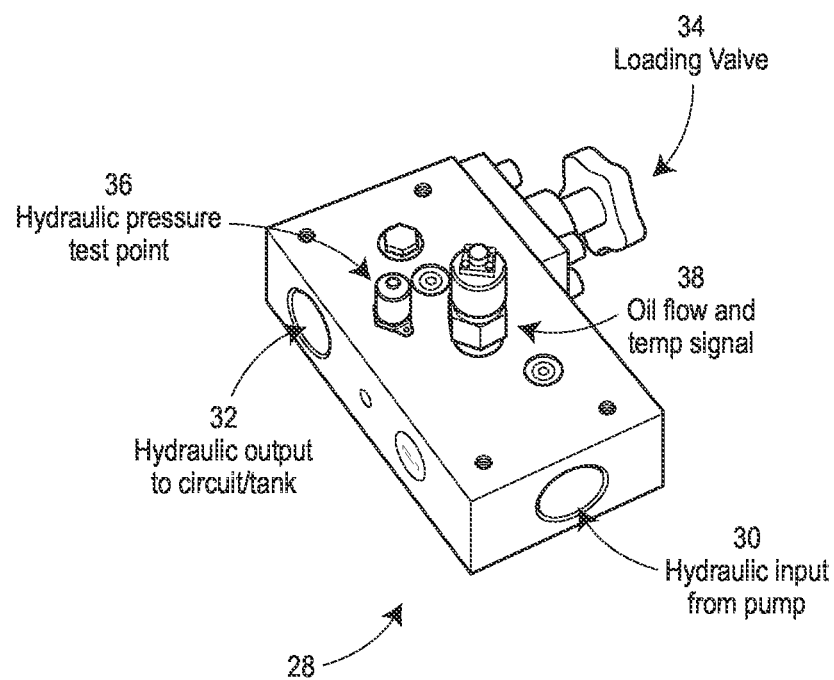
FIG. 7 depicts an example of an existing hydraulic flow meter.
Figure 8:
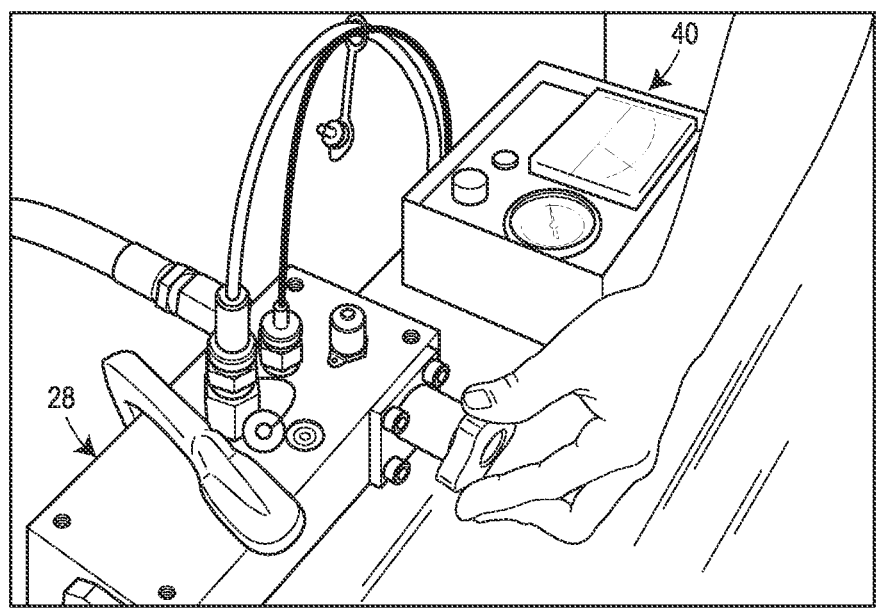
FIG. 8 depicts an example of a conventional hydraulic flow testing action being performed using an existing hydraulic flow meter.

Referring to FIGS. 21A to 21E, in the embodiment, the flow meter 152 advantageously improves on the conventional flow meter (28 in FIG. 7) design by being operable for and allowing remote actuation of loading valve assembly (34 in FIG. 7) thereof. Additionally, the flow meter 152 is operable and allows for hydraulic pressure, temperature and flow signals to be captured and transmitted electrically allowing an operator of the flow meter 152 (such as the technician 116) to be positioned at a remote, and safe or at least less hazardous, location whilst the hydraulic flow testing is being performed.

In the embodiment, the flow meter 152 is provided as a portable unit (which may be referred to as a "flow meter box") and comprises the following components:
  a conventional flow meter such as described hereinbefore under the heading "BACKGROUND". This may be, for example, an "off the shelf" flow meter provided by WEBTEC CTR/LTR (and comprising components operable to sense and provide hydraulic flow and temperature electrical signals and an integral loading valve to restrict flow through a hydraulic circuit, when coupled thereto, raising the pressure thereof);
  a power source for those components of the unit requiring power in the form of a battery (not shown);
  a drive or driving means in the form of a stepper motor 182 with built in encoder operable for and to allow closed loop control;
  a worm drive reduction gear set 184 operable for and set to drive an input shaft 186 of, and actuate, the loading valve, the loading valve input shaft 186 being operable for and splined to match the worm drive reduction gear set 184 (and replacing an original input shaft for the loading valve);
  a sealed gearbox housing 188, closed by a cover plate 190, operable for and to protect the worm drive gear set 184;
  a hydraulic pressure transducer or sensor (not shown) operable for generating and transmitting a pressure signal;
  a standard turbine type hydraulic flow meter housing 192 containing the conventional flow meter;
  a turbine pulse output for transmitting hydraulic flow rate;
  a thermocouple output for transmitting hydraulic temperature; and
  a sealed enclosure 194, fabricated from sheet metal in the embodiment, with carry handles 196 for carrying the flow meter 152 unit or box.

In the embodiment, the enclosure 194 houses the battery, the stepper motor 182, and an electronic control system (not shown), based on Arduino technology™ in the embodiment, for controlling operation of the flow meter 152. In this regard, the electronic control system of the flow meter 152 is operable to facilitate communication with the control system components of the system 110 contained within the control system and power supply case 130, the communication comprising transmitting hydraulic flow, temperature, and pressure signals to the controller 122 and receiving stepper motor control signals from the controller 122. To facilitate this, in the embodiment, the enclosure 194 houses external connectors to power and control the flow meter 152 unit, such as, for example, RJ45 data connections, W-Fi antenna, and 12/24V power connection, operably interconnected as appropriate.

The closed loop stepper motor/encoder 182, gearbox housing 188, and gears of the gear set 184 form a drive unit for driving the replacement input shaft 186.

In embodiments of the invention, the system may comprise a plurality of individual valve actuators 150, for example as a set, with a respective lead 180 running out from the control system and power supply case 130 to each individual valve actuator 150 of the plurality of valve actuators 150 to operably connect thereto.

In such embodiments, the set of sensors 144 may comprise a plurality of individual pressure transducers 146 (one for each valve actuator 150 in the system 110) operable for and to take pressure readings from each circuit being adjusted, a respective lead 148 running out from the control system and power supply case 130 to each individual pressure transducer 146 of the plurality of pressure transducers 146 to operably connect thereto, allowing for pressure feedback to touchscreen 142 of the mobile communication device 138, as hereinbefore described.

The hydraulic pressure monitoring implemented by the live display of a group of system pressures to the technician 116 via touchscreen 142 of the mobile communication device 138 allows for accurate setting of hydraulic system pressures with the hydraulic flow meter 152 and valve actuators 150.

In a particular embodiment, six individual pressure transducers 146 may be provided (which may be of type TE M529D, for example) with test couplings fitted.

The controller 122 may comprise a sampling system, operable to sample the signals received from the individual pressure transducers 146 in such an embodiment.

The system 110 is operable, to present, via the touchscreen 142, a sequence of navigable electronic pages, screens and forms to the technician 116 using the mobile communication device 138, allowing for the inputting or capture of information and/or data, including instructions and commands pertinent to operation of the system 110, to enable the technician 116 to control the system 110 and perform actions as described herein.

All data and information collected is distributed within the system 110 for use as described herein.

The technician 116 as user is able to navigate, including progressing to and returning from, the generated electronic screens and pages via execution of respective navigation interface element buttons provided thereon. Particularly, navigation bars are provided having interface element buttons via which the technician 116 can control the system 110 to perform actions. In the described embodiment, such actions include:
- remote monitoring of hydraulic flow, oil temperature and pressure from the flow meter 152;
- remote adjustment of the flow meter loading valve in order to test hydraulic circuits by restricting pump flow and raising circuit pressure;
- profiling of hydraulic pump flow and pressure output as load is increased;
- automatic tuning of the hydraulic pump 114 to a manufacturers specification by storing pressure/flow/adjustment profiles and utilising the remote hydraulic valve actuators 150 (i.e. valve actuator tuning) to make pump control adjustments while monitoring the flow and pressure output of the hydraulic pump 114;
- automatic tuning of the hydraulic pump 114 to an operators specification by utilising the remote valve actuators 150 (i.e. valve actuator tuning) to make pump control adjustments while monitoring the flow and pressure output of the hydraulic pump 114;
- remote monitoring of hydraulic pressure in circuits to be adjusted with the remote valve actuators 150;
- independent control of each remote valve actuator 150;
- automatic tuning of the hydraulic circuit to an operators specification by utilising the remote valve actuator 150 (i.e. valve actuator tuning) while monitoring the pressure of the circuit being adjusted;
- automatic tuning of hydraulic circuits to a manufacturers specification by storing pressure/adjustment profiles and utilising the remote valve actuator/pressure monitoring system;
- live flow meter tuning;
- valve circuit pressure visualisation; and
- visualisation of pressure, flow rate, and/or temperature.

The control system components of the system 110 housed in the control system and power supply case 130 are operable to send/receive data from the hydraulic flow meter 152, valve actuator 150 and hydraulic pressure monitor provided by sensors of the set of sensors 144 in order to provide these functions via the touchscreen 142 of the mobile communication device 138.

In embodiments of the invention, one or more of the described, and additional and/or alternative operations performed by the system 110, occur automatically, without requiring human intervention.

The above and other features and advantages of the embodiment of the invention will now be further described with reference to the system 110 in use.

By utilising the information supplied to the control system components of the system 110 housed in the control system and power supply case 130 by sensors of the set of sensors 144 of the system 110, the control system is operable to automatically tune hydraulic pumps and circuits based on variables provided by the technician 116 operating the system 110. In this way, the system 110 facilitates automatic tuning of hydraulic pumps and circuits.

FIG. 9 depicts a first operational set up of the system 110 of the embodiment in which the valve actuator 150 of the system 110 is mounted to a hydraulic pump adjustment point of the hydraulic pump 114 and is being controlled by the technician 116 from a remote location via the touchscreen 142 of the mobile communication device 138 in order to make pump adjustments. A hydraulic pressure transducer 146 is placed in the hydraulic circuit being adjusted to allow monitoring of the circuit pressure and provide feedback for use by the system 110.

In implementations where only the valve actuator 150 and hydraulic pressure transducer 146 are connected to a circuit, the technician 116 can provide the system 110 the desired circuit operating pressure as an input and allow the system 110 to continuously make live adjustments with the valve actuator 150 until the desired parameters for operation of the hydraulic pump 114 have been reached.

FIG. 10 depicts a second operational set up of the system 110 of the embodiment, which may be referred to as a full or complete setup, with the valve actuator 150 mounted to a hydraulic pump adjustment point of the hydraulic pump 114, a hydraulic pressure transducer 146 on the hydraulic circuit being adjusted to provide pressure feedback, and the flow meter 152 operably installed on the pump delivery line to send hydraulic flow pressure and temperature information to the control system and allow remote operation of the flow meter loading valve to test pump and circuit efficiency.

In implementations having the flow meter 152 added into the system 110, hydraulic pump and valve performance can be automatically adjusted by providing the desired circuit parameters (flow rate/pressure, for example, in the embodiment) as input to the system 110 and allowing it to make live adjustments to the flow meter loading valve to test system performance and to the system valves to seek to ensure operation of the hydraulic pump to the provided parameters.

The embodiments of the invention hereinbefore described can be improved, modified, and/or implemented with one or more features and/or components of further embodiments, now described.

It can be appreciated that the system 110 comprises four main components, being (1) the control box 131 (i.e. the control system and power supply case of the housing 130 in combination with the components housed therein), (2) the flow meter 152 unit or box, (3) a set of one or more (six or seven in the embodiment) valve actuators 150, and (4) the app installed on the mobile communication device 138.

Figure 23:
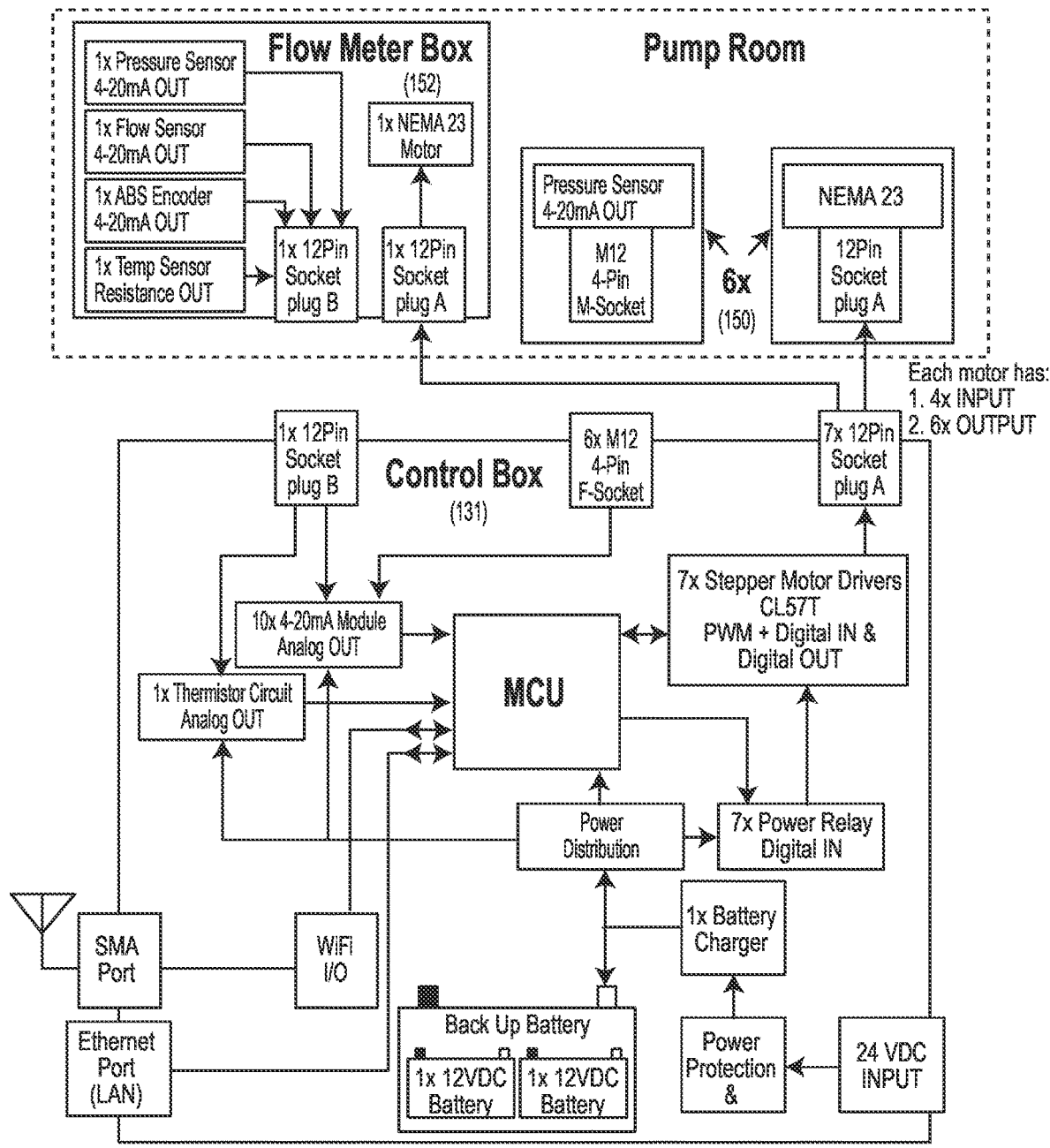
FIG. 23 depicts a schematic diagram of the interworking relationship of embodiments of a control box, flow meter box, and valve actuator(s) of an embodiment of the system of FIGS. 9 and 10.
Figure 24:
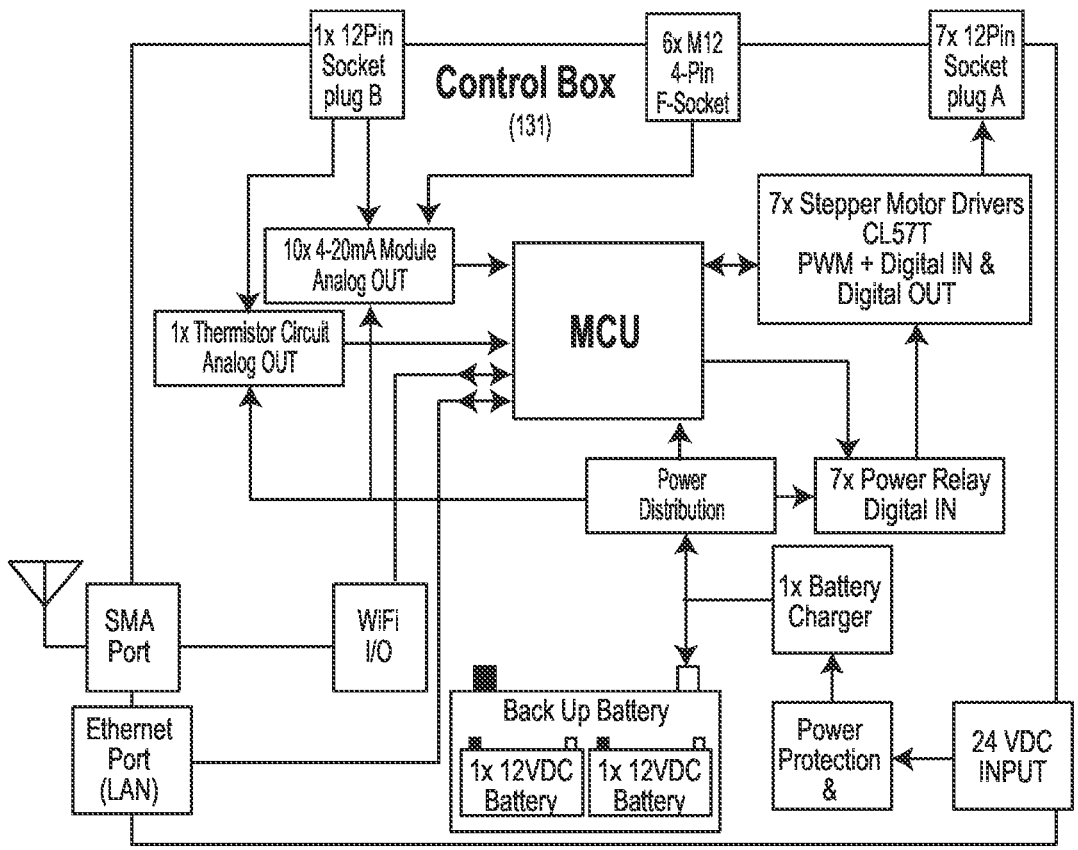
FIG. 24 depicts a schematic diagram of the embodiment of the control box of FIG. 23.
Figure 25:
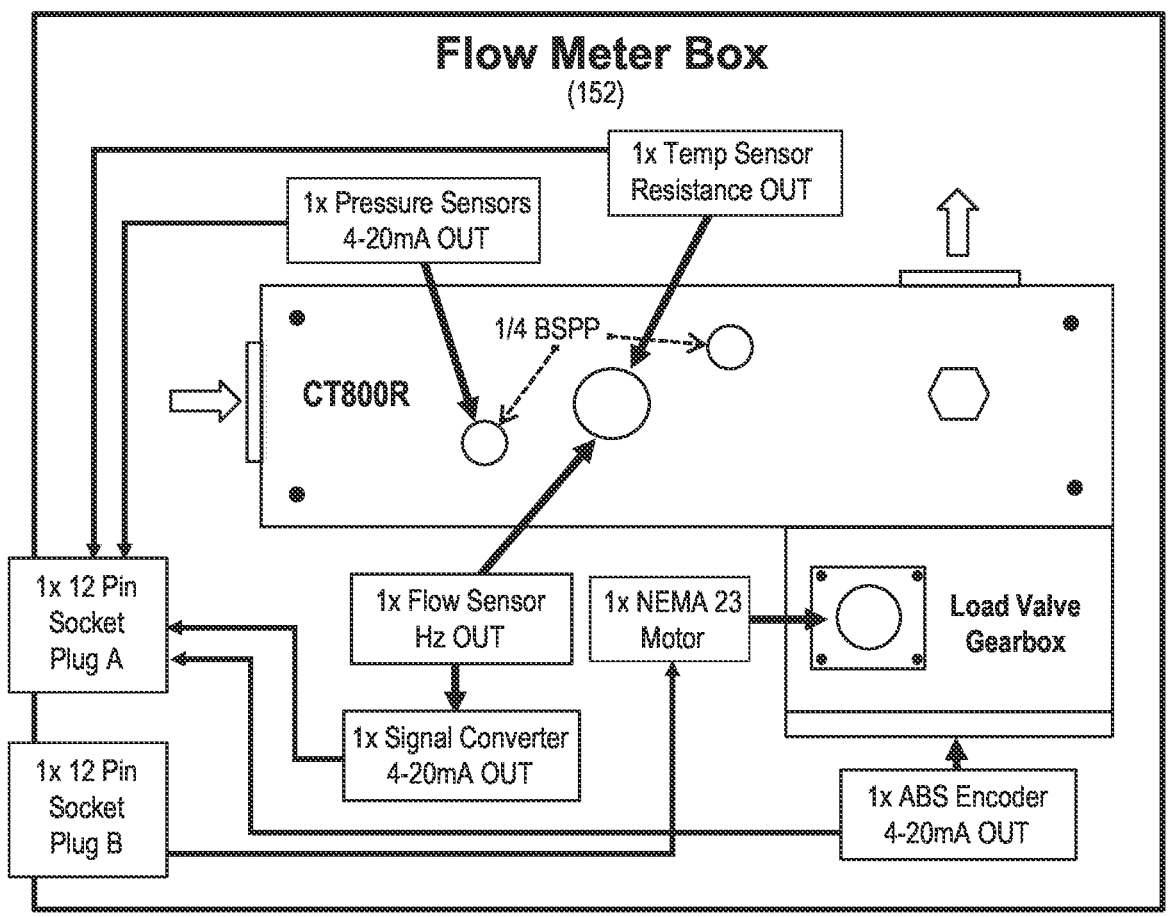
FIG. 25 depicts a schematic diagram of the embodiment of the flow meter box of FIG. 23.

FIG. 23 depicts a schematic diagram of (1), (2) and (3) of these components showing their interworking relationship in an embodiment of the invention, whilst FIG. 24 depicts a schematic diagram of (1) of these components alone, and FIG. 25 depicts a schematic diagram of (2) of these components alone.

As hereinbefore described, the control box 131 ((i.e. the control system and power supply case of the housing 130 in combination with the components housed therein), is operable to interface with motors of the set of valve actuators 150 and sensors of the set of sensors 144 to give control and send sensor information and/or data to the technician 116 via the app installed on the mobile communication device 138.

Example components with which the system 110 may be implemented in embodiments of the invention include the following:

Control box 131 Main processor (MCU)
SAME70-XPLD
Stepper motor driver
7× CL57T Stepper Drivers
4-20 mA RX module
3× Gravity: 4-20 mA module
Thermistor RX circuit
Connectors
Motors
7× 12Pin Deutsch DT Series connectors
7× Metal ITT Cannon style connectors (min 10pin)
Flow meter box
12-15pin
1× Metal ITT Cannon style connectors
Pressure sensors
M12 Female 4pin Chassis Socket—RS Stock No. 721-1235 24VDC Power In
WiFi antenna
IP65 UF.L to SMA bulkhead 250 mm—336319-12-0250
SMA dust cap with chain—3-1478985-0
Lan port
IP65 RJ45 Chassis Socket—NE8FDY-C6
IP65 RJ45 Line plug—NE8MC6-MO
IP65 Spring-loaded cover—SCCD-W
Cable assembly's
Motor loom
1× 4-Core 18 AWG
1× 6-Core Shielded 22-18 AWG
Flowmeter box loom
1× 12 to 16-Core Shielded 22-18 AWG
Pressure sensors
3 m Phoenix Contact M12 4-Pin M to F PUR Cable assembly
PT #—1668386—No shielding
PT #—1500871—Braided shielding
24 VDC power
1× 2-Core 16 to 8 AWG
Battery back up
2× 12V gel cell batteries
Battery charger
Enclosure
Pelican 1600 Protector Case (with No foam) or similar size
Tablet PC
Senter S917, PAD-HGF As hereinbefore described, the flow meter 152 is operable to monitor and control main pressure flow into the control valves.

Example components with which the flow meter 152 may be implemented in embodiments of the invention include the following:

Turbine flow meter block
Webtec CTR/LTR Turbine flow meter with loading valve. Part #LT800R-FM-S-B-7
Comes with frequency output RPM sensor and NTC Temp sensor
Flow RPM sensor
Webtec LTR Series sensor
Has Frequency Output—20-2000 Hz Sinusoidal AC signal
Signal voltage range is 30 mV to 10V (Non Linear)
Flow rate signal requires linearization calibration at set points
Temperature sensor
Webtec LTR Series sensor
Sensor is a NTC thermistor (is inside the RPM sensor)
Flow RPM to 4-20 mA Signal Converter
Status SEM1600F
Cynergy3 SC-FREQCON
Stepper motor
1× NEMA 23 stepper Motor model 23HS22-2804D-E1000
Attached to custom 15:1 gearbox
Pressure sensor
1× TE Model TE M5200
M12 4-Pin connector
4-20 mA output is a 2-wire configuration
Absolute encoder
1× POSTAL FRABA magnetic encoder Part #: UCD-AC005-0413-V6S0-2RW
4-20 mA output is a 3-wire configuration
Cable assembly's
Motor loom
1× 4-Core 18 AWG
1× 6-Core Shielded 22-18 AWG
Flowmeter box loom
1× 12 to 16-Core Shielded 22-18 AWG
Enclosure
Pelican 1460 Protector Case (with No foam) or similar size
Connectors
Motors
1× 12Pin Deutsch DT Series connectors
1× Metal ITT Cannon style connectors (min 10pin)
Flowmeter box sensors (all 4)
1× (12-15pin)

Figure 26:
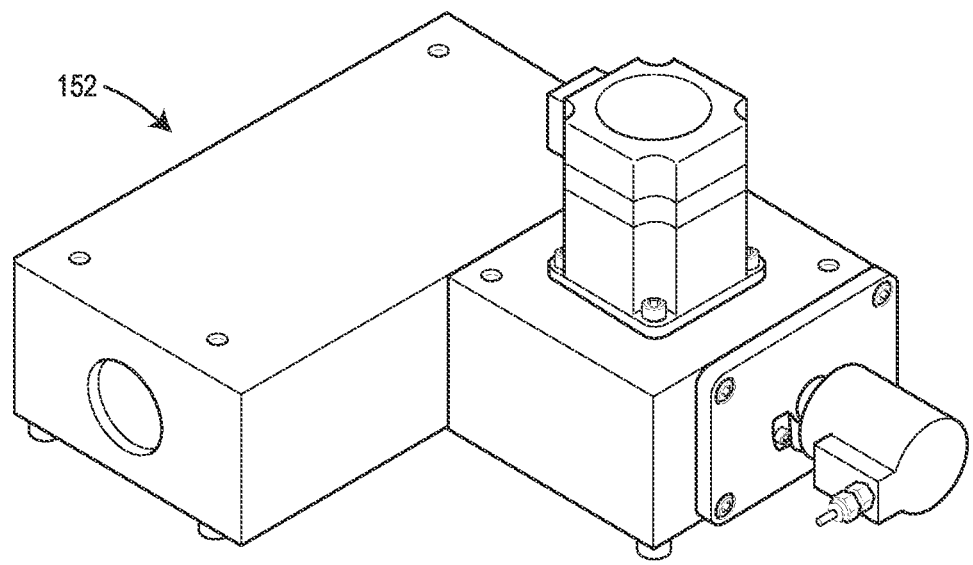
FIG. 26 depicts a perspective view of an example embodiment of the flow meter box of FIG. 23 without a covering portion in place.
Figure 27:
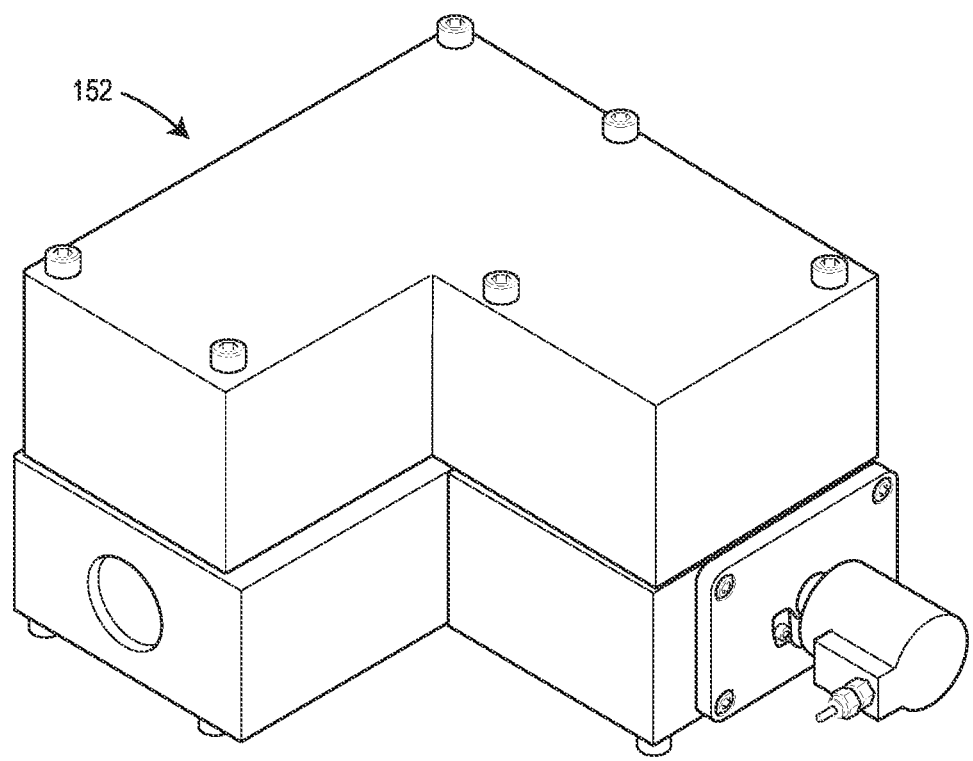
FIG. 27 depicts a perspective view of an example embodiment of the flow meter box of FIG. 23 with a covering portion in place.

FIGS. 26 and 27 depict, respectively, perspective views of an example embodiment of the flow meter 152 without and with a covering portion of the flow meter 152 unit or box in place.

As hereinbefore described, embodiments of the universal valve actuator 150 comprise stepper motors mounted onto custom brackets, that are then mounted and operably connected onto each individual valve adjustment point 156 via a custom made motor shaft adapter.

Figure 28:
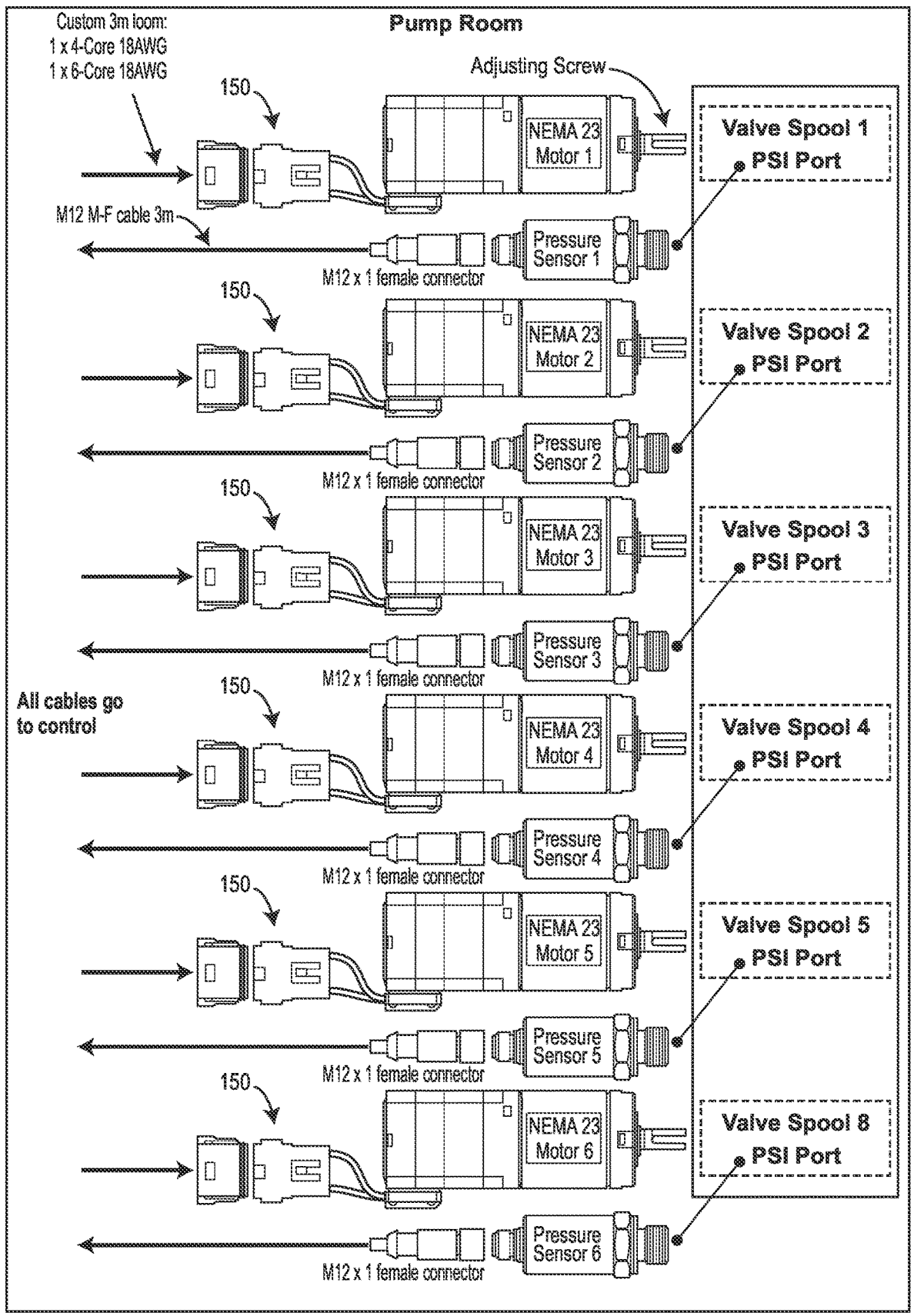
FIG. 28 depicts a schematic block diagram of an example of a set of valve actuators of FIG. 23 deployed in a room or other space housing one or more pumps.

FIG. 28 depicts a schematic block diagram showing an example of an implementation of this in a room or other space housing one or more pumps (for example, a control or pump room of the Excavator/Loading Shovel 210).

Example components with which the universal valve actuator 150 may be implemented in embodiments of the invention include the following:

Stepper motor
6× NEMA 23 stepper Motor model 23HS22-2804D-PG15-E1000
Gearbox is 15:1
Pressure sensor
6× TE Model TE M5200
M12 4-Pin connector
4-20 mA output is a 2-wire configuration
Cable assembly's
Motor loom
1× 4-Core 18 AWG
1× 6-Core Shielded 22-18 AWG
Pressure sensors
3 m Phoenix Contact M12 4-Pin M to F PUR Cable assembly
PT #—1668386—No shielding
PT #—1500871—Braided shielding Connectors
Motors
12pin Deutsch DT Male receptacle PT #—DT04-12PA-0015
Metal ITT Cannon style connectors (min 10pin)

Figure 29:
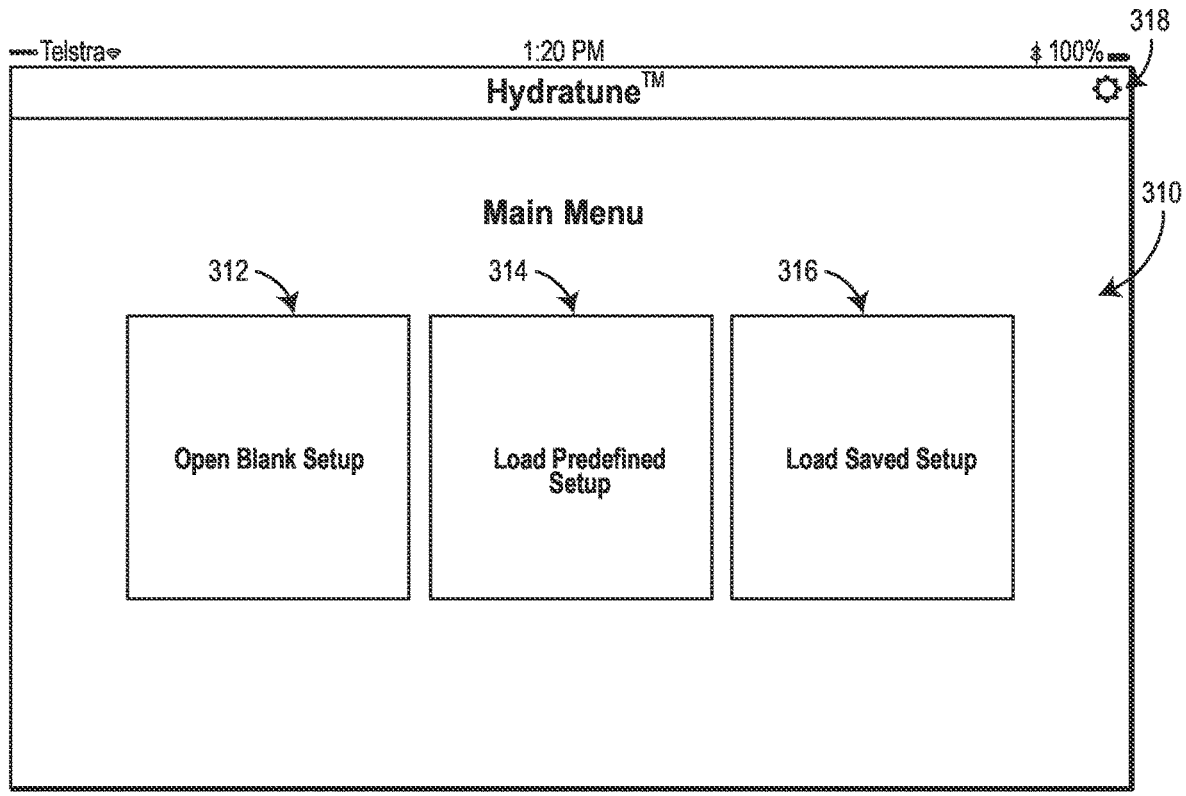
FIG. 29 depicts an example of a Main Menu Page screen of a user interface generated and displayed via a display of a mobile communication device of the system of FIGS. 9 and 10.
Figure 30:
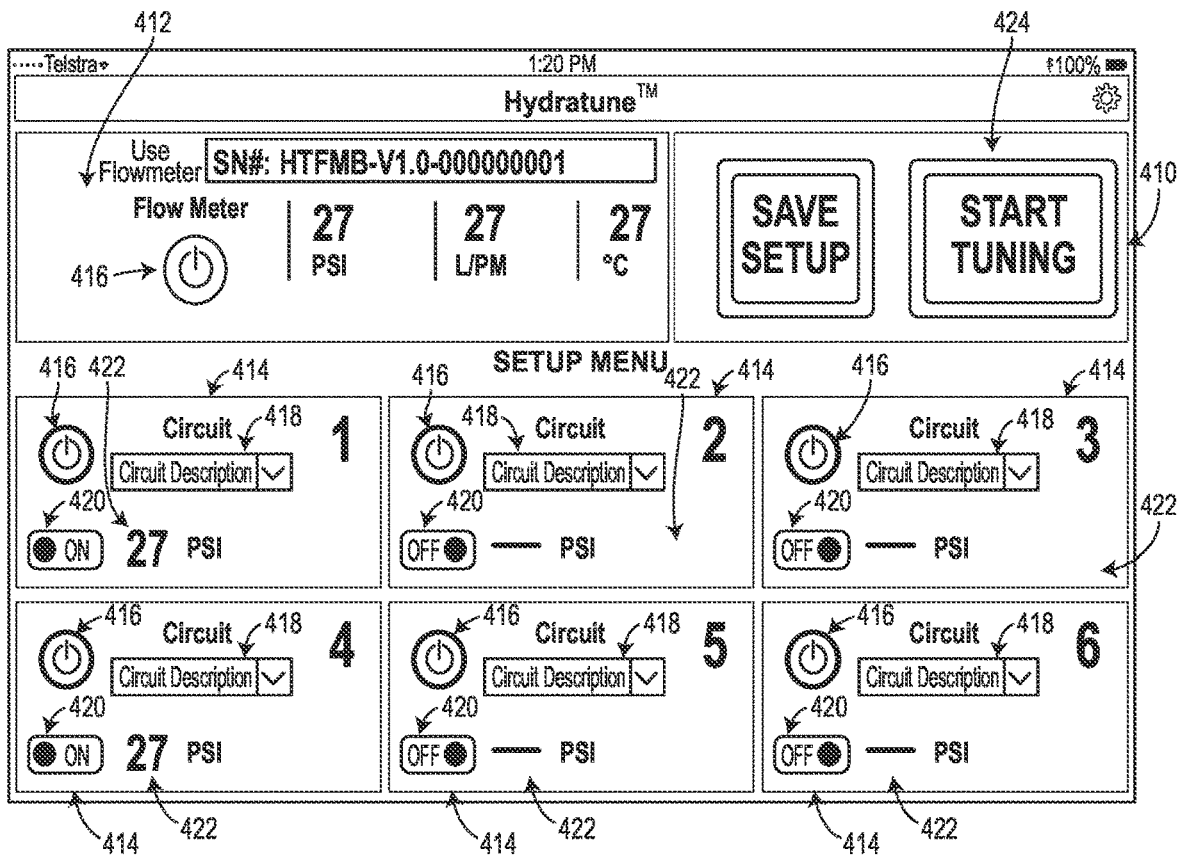
FIG. 30 depicts an example of a Setup Menu Page screen of the user interface generated and displayed via the display.
Figure 31:
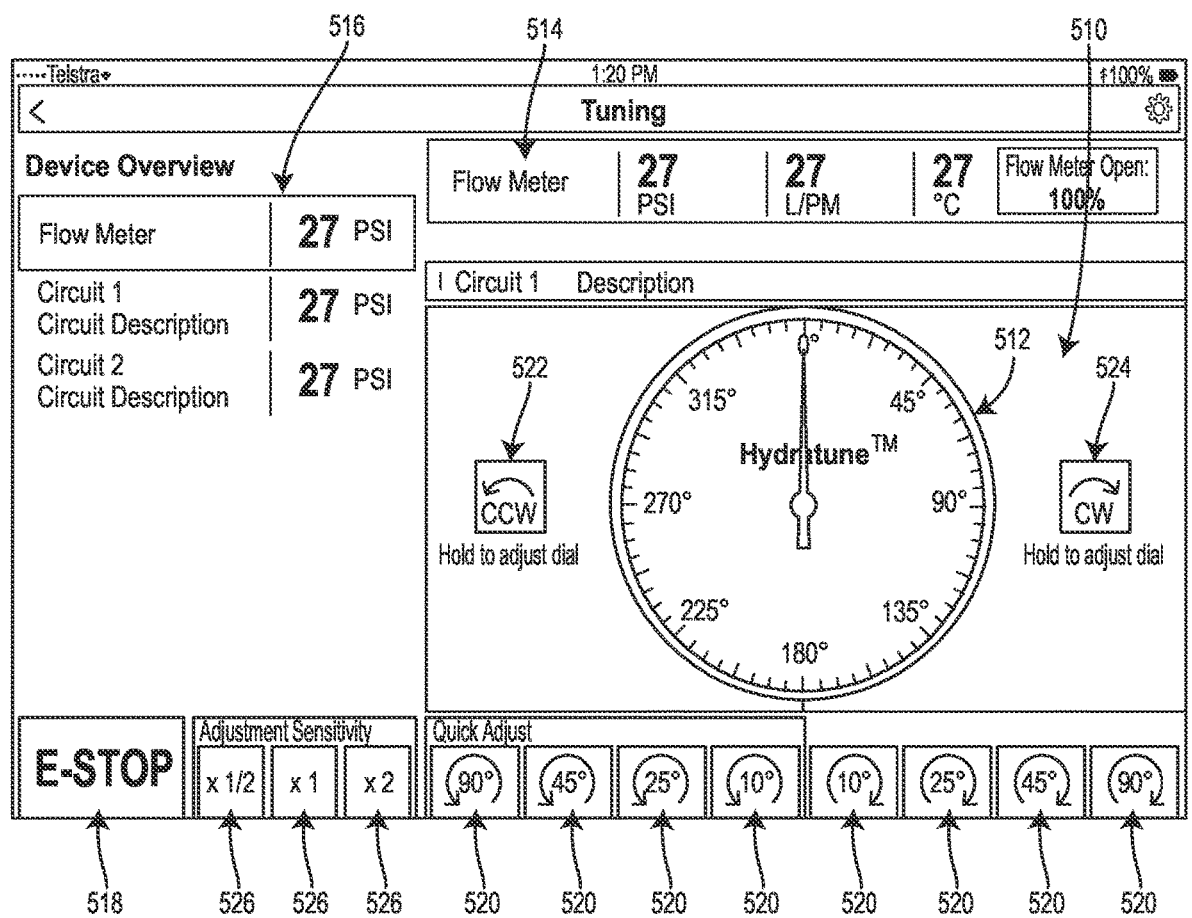
FIG. 31 depicts an example of a Tuning Menu—Circuit Page screen of the user interface generated and displayed via the display.

In embodiments of the invention, the navigable electronic pages, screens and forms that the app of the system 110 is operable to generate and display via the touchscreen 142 of the mobile communication device 138 include: a Main Menu Page 310, a Setup Menu Page 410, and a Tuning Menu—Circuit Page 510, as depicted in FIGS. 29, 30 and 31, respectively.

Figure 32:
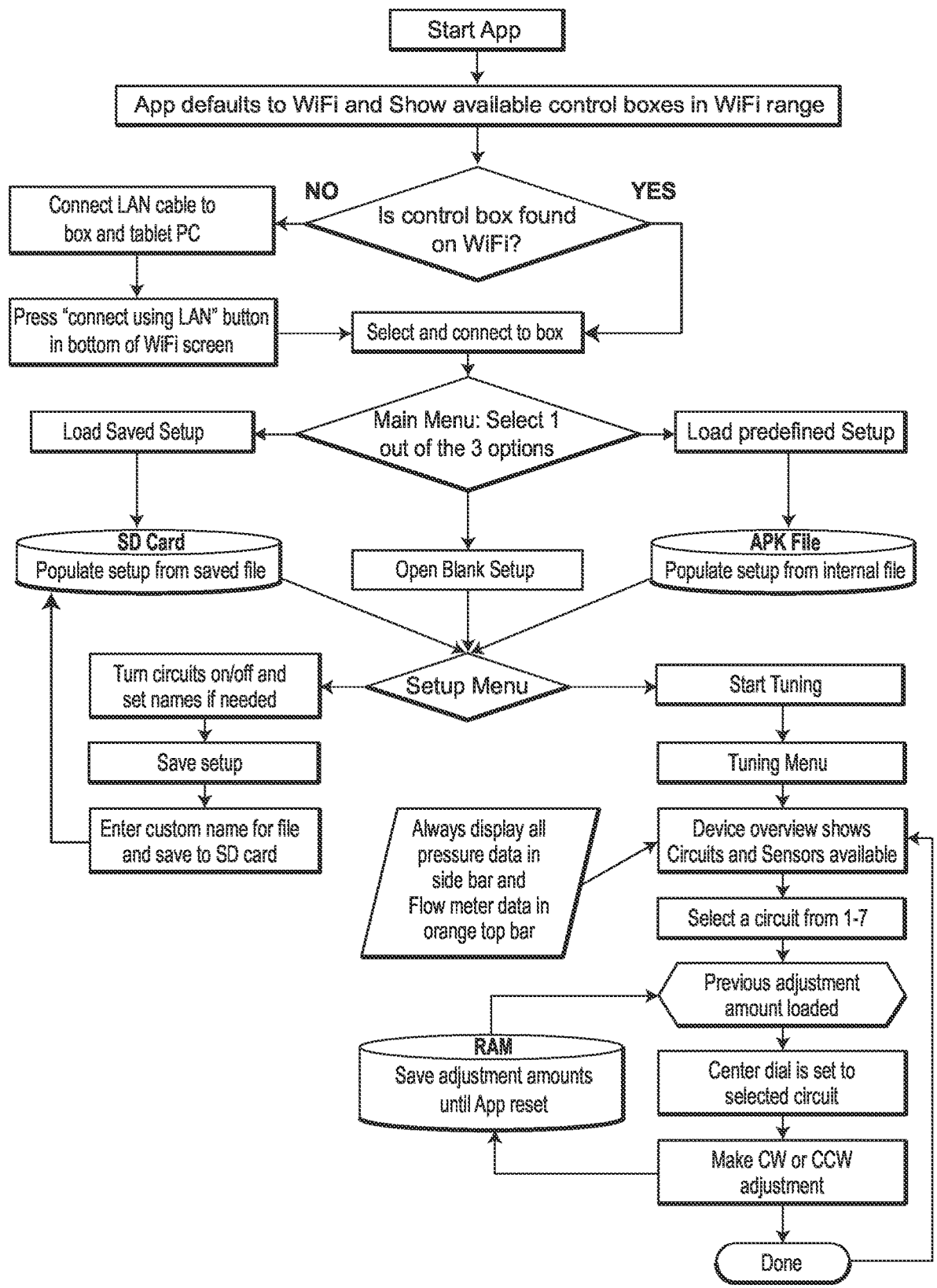
FIG. 32 depicts a flow chart of a program sequence of actions performed by a software app of the system of FIGS. 9 and 10.

FIG. 32 depicts a flow chart of a program sequence of actions performed by the app.

Use of embodiments of the system 110 may comprise one or more of the following steps, actions and/or activities:

Installation and Integration
1. User arrives at machine to be worked on, such as Excavator/Loading Shovel 210.
2. User carries 3× protective cases up and into machine as appropriate:
   a. 1× Control system box;
   b. 1× Flowmeter box;
   c. 1× Box containing motors (valve actuators 150), pressure sensors and all connection cables.
3. User unpacks motors (valve actuators 150) whereby each is identical with no identification markings.
4. User attaches up to 6× motors (valve actuators 150) onto each valve spool that is to be adjusted using custom made brackets.
5. User unpacks motor control looms; whereby each loom has a label at each end that:
   a. range from 1-7.
6. User plugs each of the motor control looms into a motor that matches the order they are installed in, i.e. from 1-6.
7. User unpacks the 6× pressure sensors.
   a) a pressure sensor is installed into each cylinder valve port requiring adjustment.

The Following Steps Apply for the Sensors:
1. User unpacks M12 Male-Female pressure sensor cables; each cable has a label at each end with a single number from 1-6.
2. User plugs each of the corresponding M12 sensor cables into each pressure sensor that matches with the relevant adjustment motor loom number, i.e. 1-6.
3. User installs the flow meter inline between the hydraulic pump delivery line and the control valve.
4. User unpacks the 2×flowmeter looms. Each loom has a label at each end with:
   a. Flowmeter sensors (will only be 1× and will have black plugs and different keyway).
   b. 'Flowmeter Motor' or '7' (7 will always correspond to the Flowmeter but looms 1-7 will all be identical).
5. User then plugs in the 2× cable looms into the corresponding sockets on the outside of flow meter 152 box.
6. User then runs all 14× connection cables out of pump room and back to the control system box.
7. Each connection socket on the outside of the control system box will have a label with:
   a. Motor 1-7 (10 pin sockets)
   b. Pressure sensor 1-6 (M12 sockets)
   c. Flowmeter (12 or 15 pin socket)
8. User matches up the 14× cable loom ID labels with the corresponding socket names and numbers then plugs each one in.
9. User then unpacks 1× of the 2× supplied 24V DC power cable and connects one end into the control box 131 and:
   a. The other end into a 'CAT jump start receptacle' somewhere on the machine.
   b. The other end onto a 24V battery point using Alligator clips.
10. User sets up WiFi antenna.
    a. User will remove dust cap from SMA connector located on the side of the control box 131;
    b. User then screws on WiFi antenna cable or whip antenna;
    c. Antenna may be, for example, Omni Whip Antenna or Directional Antenna on cable with magnetic base.
11. User then switches on control box 131 via a switch inside the control box 131.
12. Once all 4× status lights inside the control box 131 are green, the control box 131 is powered and user is ready to connect.
13. User then closes control box 131 lid to limit dust and dirt getting in.

Testing
1. Once the control box 131 is powered on and all status lights display green, the user is ready to connect
   a. Follow the hereinbefore described "Installation and Integration" steps.
2. User stays with control box 131 and turns on the mobile communication device 138 and opens the app and connects to the control box 131.
   a. Follow the hereinafter described "Connectivity Steps."
3. Once connected, the app (via the touchscreen 144 of the mobile communication device 138) is operable to show all available motors, pressure sensors and flowmeter boxes that are set up and connected.
   a. Follow the hereinafter described "Initial Setup" steps.
4. User should check that the number of motors and sensors connected to the system corresponds to those shown on the app.
   a. A pressure sensor that is set up but not connected will show an error on screen.
   b. A pressure sensor that is reading 0 will just read 0 but not show an error.
   c. In embodiments, an un-connected motor will show an error.
5. While the machine is off, the user should check that all motors are set up and working correctly by going into the pump room thereof, then using the app to move each motor clockwise (CW) and counter-clockwise (CCW) a few degrees (as hereinafter described).
6. User should also check at the same time that, the name or number of the motor they are adjusting in the app, matches with the same spool valve and motor on the machine.
7. User should then check that flowmeter 152 box is working by adjusting the motor CW and CCW a few degrees and seeing that the angle reading generated and displayed on the touchscreen 144 also changes accordingly.
   a. All sensors apart from temperature should also be reading 0.
8. Once user is happy with everything, they can leave the pump room and start the machine.
9. User should check that the 6× pressure sensors are set up and connected correctly by using the app to move each of the 6× motors CW and CCW a few degrees.

10. Once user is happy with everything, they can move to the cab of the machine and begin tuning activities.

Initial Setup

1. User needs to connect all motors and sensors:
   a. Follow the hereinbefore described "Installation and Integration" steps.
   b. Note: care must be taken to connect everything into the correct location.
2. User opens the app and connects to the control box 131:
   a. Follow the hereinafter described "Connectivity" steps.
3. Once connected, the user will be directed to the Main Menu Page 310 screen.
4. The user is provided with three option buttons via the Main Menu Page 310 screen, as follows: Open Blank Setup 312, Load Predefined Setup 314, and Load Saved User Setup 316.
5. Open 'blank setup'
   a. This is a blank set up with no names added and nothing selected. When the user selects this option, they will be directed to the Setup Menu Page 410 screen.
   b. The Setup Menu Page 410 screen displays:
      i. 1× orange Flow Meter Box 412 at the top for operating and displaying flow meter 152 details, including information and data.
      ii. 6× white Circuit Boxes 414 at the bottom for operating and displaying tuning circuits and pressure sensors 1-6 details, including information and data.
   c. User activates the required circuits and/or flow meter 152 by pressing on the corresponding RED Power Buttons 416. Once active or on, the Power Buttons 416 will turn GREEN.
   d. To add a Flow meter, the user must tap on the RED Power Button 416 in the orange Flow Meter Box 412. The stored flow meter box calibration and setup data that was entered at factory into the control box 131 is automatically entered and activated. In embodiments of the invention, all flow meter box outputs are standard 4-20 ma with the calibration handled by converters in the box.
      i. Note: only one 'Flowmeter' can be set up in embodiments of the invention. Alternative embodiments may allow for more than one flow meter to be set up.
   e. To add a tuning Circuit, the user taps on the corresponding RED Power Button 416 in the white Circuit Box 414. When the Power Button 416 is GREEN, the circuit corresponding thereto is on.
   f. Circuits can be activated in any order the user desires.
   g. User can input a 'circuit description' or name using a Circuit Description Dropdown Box 418.
      i. From there, the user can pick/select from a pre-set drop-down list of names (for example, boom, stick, or bucket) as appropriate.
      ii. Or user can pick/select 'Custom' from the down list and input their own name. This will be at the top of the list.
   h. User can then specify whether a pressure sensor will be used by tapping the corresponding On/Off Button 420 next to the Pressure Reading 422 display for the pressure sensor.
      i. In the embodiment, pressure sensors can still be used even if the circuit tune is tuned off.
   i. Once user has activated and named all the circuits they require they can then save this set up to the mobile communication device 138 and with a custom file name (for example, BHP Custom CAT Digger #245).
6. Load 'predefined setup'
   a. In the embodiment, the app has predefined circuit setups saved for commonly serviced machines that when loaded will prefill and select circuits for that machine.
   b. When user enters the Load Predefined Setup 314 option, it will direct them to a list of 10 common machines, e.g. CAT 6060.
   c. Once user selects a machine they want, the app will then switch to the Setup Menu Page 410 screen where the predetermined number of circuits will be enabled and corresponding circuit names for that particular machine added.
   d. User can then edit the circuits if needed and save as a custom user setup.
7. Load 'saved user setup'
   a. The Load Saved User Setup 316 button will direct the user to the list of custom user setups made.
      i. These may be saved to memory such as a SD card on the mobile communication device 138.
         1. This will act as an additional backup in the event of damage to the mobile communication device 138.
   b. User finds and taps on the required file; app will then move to the Setup Menu Page 410 screen.

Advanced Settings

To get to advanced settings, the user taps on a Small Gear Device 318 in the corner of the displayed screen. A generated and displayed Advanced Settings Page screen shows:

1. 4-20 mA RX check—These steps should be followed for calibration of all the 4-20 mA receivers inside the control box 131:
   a. User will see a list that has pressure sensors 1-6 and flow meter 152 pressure, temperature, flow and valve rotation.
   b. User clicks on the input they want to check.
   c. A box will display asking them to disconnect sensors cables from the control box 131 before tapping 'Next'.
   d. The screen should then display 0 mA, and if not, the user should tap a 'zero sensor' icon.
   e. The user then taps next and a box will appear requesting to connect 4-20 mA simulator box.
   f. User then plugs in 4-20 mA simulator box to the input being tested and taps next.
   g. Next box says, 'set simulator box to 1.00 mA'. User tunes knob on simulator box to 1.00 mA.
   h. App screen should show 1.00 mA, if not user then then taps 'set 1.00 mA'. Screen should show 1.00 mA now.
   i. User taps 'Next'.
   j. Steps 'g' to 'i' should be repeated with the values 4 mA, 8 mA, 16 mA and 20 mA.
   k. User then taps 'Done' to continue.
   l. App via the touchscreen 144 asks 'Are you sure you want to save these settings' to which the user then taps 'Yes' or 'No.'
   m. User is directed back to Advanced Settings Page screen.
2. Sensor input calibration—This is used for adding calibration value offsets for the pressure, temperature and flow sensors.

a. User will see a list of available sensors that have been set up.
   i. Follow the hereinbefore described "Initial Setup" steps.
3. System Voltages screen—in this the user can view the input voltage and voltages on the control board.
   a. This screen will show:
      i. Input voltage=24-30V.
      ii. V5 Rail=5.00V.
      iii. 3V3 rail=3.30V.
      iv. User then taps 'Ok' and goes back to Advanced Settings Page screen.
4. WiFi and LAN settings/options?
   a. Change or edit WiFi password:
      i. This can only be done when connecting to the box via LAN, in the embodiment.
   b. Change or edit box Name
      i. User can edit all or part of the box name that is shown in WiFi and LAN.

Connectivity
1. Once user starts the app it will automatically default to the WiFi connection options.
2. WiFi
   a. Once the app has loaded the screen will display the available control boxes 131 in WiFi range in a list.
      i. This screen also has a button to refresh WiFi searching, in the embodiment.
   b. User selects the box that has the same name or serial number of the one they are using:
      i. Name or serial number of control box 131 will be on a sticker on top and inside box.
   c. Once selected a pop-up box asks them to input a password or passkey?
      i. Password or passkey will be on a sticker inside box, in embodiments of the invention.
      ii. If Password is lost, the user follows the hereinbefore described "Advanced Settings" steps.
   d. Once the correct pass key is entered app screen will go to the Main Menu Page 310 screen.
   e. If user is having problem with WiFi connection, then a direct hard wire connection can be made using LAN.
3. LAN
   a. User must connect LAN/Ethernet cable from control box 131 to the mobile communication device 138.
   b. In the bottom corner of the 'available control boxes 131 in WiFi range' screen there will be a button called "Connect using LAN".
   c. When user taps on the "Connect using LAN" button, the app will go to a new screen and display the control boxes 131 that it is able to connect with.
      i. This screen also has a button to refresh 'search'.
   d. User selects the box that has the same name or serial number of the one they are using:
      i. The name or serial number of control box 131 will be on a sticker on top and inside the control box 131 in embodiments of the invention
   e. No password or passkey is needed, in the embodiment.
   f. App screen will go to the Main Menu Page 310 screen.

App use
1. From the Setup Menu Page 410 screen the user taps on the Start Tuning 424 button/box generated in the top right of the screen.
2. The Tuning Menu—Circuit Page 510 screen now opens. User will see, generated and displayed via the touchscreen 138:
   a. Centre Dial 512—This shows the amount of valve/motor adjustment (i.e. this will show current position relative to when the app was started) that the user has made while using the app for the currently selected motor of a respective valve actuator 150.
      a. The adjustment amount will be stored for each motor until the control box 131 is reset.
      b. The name and description of the selected device is displayed above the tuning Centre Dial 512.
      c. Flow Meter Gauge Display 514 may have a scale from 0-100% rather than 0-360°, in embodiments of the invention.
   b. Device Overview 516—This is the device list that is located on the left side of the Tuning Menu—Circuit Page 510 screen. User can toggle between Circuits they want to adjust by tapping on the desired circuit in the device list.
      a. Up to 7 devices will be displayed, along with their description and real-time pressure readings, in the embodiment.
      b. The flow meter readings will always be displayed regardless of what device is selected, this located in the panel beneath the device name and description.
   c. E-Stop or Emergency Stop 518 button, operable for causing an emergency stop of the system 110 once activated.
3. When a circuit is selected, the user can make adjustments to the circuit in the following ways:
   a. In increments, using the Adjustment Buttons 520 displaying amount (degrees) and direction (CCW/CW).
   b. Holding the CCW Button 522 or CW Button 524 located either side of the tuning Centre Dial 512.
   c. The user can select the sensitivity or speed at which the tuning dial adjusts with the Adjustment Sensitivity Buttons 526 (for example, x1/2, x1, x2).
   b. The tuning Centre Dial 512 displays the amount of valve adjustment/rotation that the user has made since the app was started.
4. If the adjusting motor of a valve actuator 150 is stalled (i.e. the motor has tuned the valve to a full off or on position and hit a hard stop or jammed up) then:
   a. A pop-up box will be generated and displayed via the touchscreen 138 saying "Motor Stalled!" with a button saying "Reset".
   b. In response, the user taps Reset—this will power cycle the stepper motor driver for that specific motor.
   c. The pop-up box will then disappear and the app will return to the Tuning Menu—Circuit Page 510 screen.
   d. User should then rotate the motor in the opposite direction to what made it stall.
   e. If they turn it the same way the box will pop up again.

It can be appreciated that the user can make real time adjustments to each valve by simply pressing the CCW Button 522 or CW Button 524 in the app, all from the comfort of the driver's cab, for example, in the case where the machine is an Excavator/Loading Shovel 210.

It will be appreciated that the described embodiment of the invention provides several advantages as highlighted and described earlier herein, including:

providing a user with safer working conditions by mitigating nearly all risk;

saving time by allowing a user to make adjustments to multiple hydraulic circuits and test them straight away; and providing a better system overview by allowing a user to monitor and display all readings from the hydraulic system on one screen.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

The invention claimed is:

1. An actuator for actuating a device, the actuator comprising driving means adapted to be operatively connected to the device, the driving means operable to receive a reaction element for engaging the device, wherein the driving means further comprises (i) an output adapted to be operatively engaged with the device for actuation of the device whilst the reaction element is engaging the device, (ii) a first spline for receiving the reaction element, the reaction element comprising a reaction arm for engaging the device and a matching second spline adapted to be received by the first spline, and (iii) a stepper motor comprising a built in encoder operable for and to allow closed loop gear reduction control.

2. An actuator according to claim 1, wherein the driving means further comprises:
planetary gear reduction contained in a planetary housing;
a backing plate operable for and to ensure that the reaction element is correctly installed on the first spline;
output bearings operable for and to handle side loading created by mounting the actuator; and
a ball detent provided on the reaction arm.

3. An actuator according to claim 1, wherein the first spline comprises a first profile and the matching second spline comprises a second profile, the first and second profiles being adapted to engage each other to attach the reaction element to the driving means.

4. An actuator according to claim 3, wherein the first profile comprises an external profile for receiving an internal matching second profile of the reaction element.

5. An actuator according to claim 3, wherein the first profile comprises a circular profile.

6. An actuator according to claim 1, being adapted to be operatively connected to a power supply and to a control system of the device.

7. An actuator according to claim 1, wherein the output comprises an output shaft comprising a square drive output.

8. An actuator according to claim 1, wherein the driving means is adapted to releasably receive the reaction element.

9. An actuator according to claim 1, wherein the actuator is adapted to be actuated remotely.

10. An actuator according to claim 1, wherein the device comprises a hydraulic adjustment point of a hydraulic system.

11. An actuating assembly comprising an actuator according to claim 1, wherein the reaction element is adapted to be attached to the actuator permitting the actuator to be operatively connected to the device.

12. An actuating assembly according to claim 11, wherein the reaction element is adapted to be releasably attached to the actuator.

13. An actuating assembly according to claim 11, wherein the matching second spline comprises a second profile.

14. An actuating assembly according to claim 13, wherein the second profile comprises an internal matching second profile.

15. An actuating assembly according to claim 13, wherein the second profile comprises a circular profile.

16. An actuating assembly according to claim 11, wherein the reaction element is configured in such a manner that the reaction arm engages the device at a first location of the device, and wherein the matching second spline operatively engages the first spline in such a manner that the actuator operatively engages the device at a second location of the device for actuation of the device.

17. An actuating assembly according to claim 16, wherein the first location comprises a location of the device for supporting the reaction arm to maintain the actuator attached to the device.

18. An actuating assembly according to claim 16, wherein the second location comprises a location of the device for the actuator to operatively engage the device for actuation of the device.

19. An actuating assembly according to claim 11, wherein the reaction arm and the matching second spline are arranged perpendicular with respect to each other.

20. A tool comprising a plurality of actuators, each of the plurality of actuators being an actuator according to claim 1.

21. A tool according to claim 20, wherein the reaction element is adapted to be releasably attached to the actuator.

22. A tool according to claim 20, wherein the matching second spline comprises a second profile.

23. A tool according to claim 22, wherein the second profile comprises an internal second profile.

24. A tool according to claim 23, wherein the second profile comprises a circular profile.

25. A tool according to claim 20, wherein the reaction element is configured in such a manner that the reaction arm engages the device at a first location of the device, and the matching second spline operatively engages the first spline in such manner that the actuator operatively engages the device at a second location of the device for actuation of the device.

26. A tool according to claim 25, wherein the first location comprises a location of the device for supporting the reaction arm to maintain the actuator attached to the device.

27. A tool according to claim 25, wherein the second location comprises a location of the device for the actuator to operatively engage the device for actuation of the device.

28. A tool according to claim 20, wherein the reaction arm and the matching second spline are arranged perpendicular with respect to each other.

* * * * *